(12) United States Patent
Nagahari et al.

(10) Patent No.: US 10,703,040 B2
(45) Date of Patent: Jul. 7, 2020

(54) METHOD FOR FORMING THREE-DIMENSIONAL OBJECT, AND THREE-DIMENSIONAL PRINTER

(71) Applicant: MIMAKI ENGINEERING CO., LTD., Nagano (JP)

(72) Inventors: Masaya Nagahari, Nagano (JP); Hirofumi Hara, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 276 days.

(21) Appl. No.: 15/564,173

(22) PCT Filed: Apr. 12, 2016

(86) PCT No.: PCT/JP2016/061784
§ 371 (c)(1),
(2) Date: Oct. 3, 2017

(87) PCT Pub. No.: WO2016/167239
PCT Pub. Date: Oct. 20, 2016

(65) Prior Publication Data
US 2018/0117833 A1    May 3, 2018

(30) Foreign Application Priority Data
Apr. 13, 2015    (JP) .................................. 2015-082023

(51) Int. Cl.
*B33Y 10/00*    (2015.01)
*B29C 64/112*    (2017.01)
(Continued)

(52) U.S. Cl.
CPC .......... *B29C 64/112* (2017.08); *B29C 31/045* (2013.01); *B29C 67/00* (2013.01);
(Continued)

(58) Field of Classification Search
CPC ... B29C 64/112; B29C 64/393; B29C 31/045; B33Y 10/00; B33Y 30/00; B33Y 50/02
(Continued)

(56) References Cited

FOREIGN PATENT DOCUMENTS

JP    2004090530 A2    3/2004
JP    2013208878 A2    10/2013

OTHER PUBLICATIONS

Extended European Search Report dated Feb. 13, 2018 issued in the corresponding European patent applicatio No. 16780030.9.
(Continued)

*Primary Examiner* — Christina A Johnson
*Assistant Examiner* — Xue H Liu
(74) *Attorney, Agent, or Firm* — Rankin, Hill & Clark LLP

(57) ABSTRACT

[Object] It is an object to provide a method for forming a three-dimensional object that suppresses generation of streaks on the three-dimensional object, which streaks are parallel to a main scanning direction.
[Means of Realizing the Object] A method for forming a three-dimensional object includes a slice information calculation step (step ST23) of dividing three-dimensional data of the three-dimensional object into a plurality of layers so as to calculate cross-sectional slice information of each of the layers; and a unit-layer formation step (step ST27) of forming each of the layers based on the cross-sectional slice information. The unit-layer formation step (step ST27) is repeated a plurality of times. The unit-layer formation step (step ST27) includes a printing step (step ST27A) of extruding inks onto a work surface while moving the extruders in the main scanning direction so as to form a single print path. The printing step and a sub-scanning direction movement step (step ST27B) of moving the work surface in a sub-scanning direction are alternately performed. The print paths
(Continued)

are formed in such a manner that a boundary between the print paths between each adjacent pair of layers in a deposition direction of the layers is at least partly deviated in the sub-scanning direction.

14 Claims, 11 Drawing Sheets

(51) Int. Cl.
  *B33Y 30/00* (2015.01)
  *B33Y 50/02* (2015.01)
  *B29C 67/00* (2017.01)
  *H04N 1/40* (2006.01)
  *B29C 31/04* (2006.01)
  *B29C 64/393* (2017.01)

(52) U.S. Cl.
  CPC ............... *B33Y 10/00* (2014.12); *B33Y 30/00* (2014.12); *B33Y 50/02* (2014.12); *H04N 1/40* (2013.01); *B29C 64/393* (2017.08)

(58) Field of Classification Search
  USPC ........................................................ 264/219
  See application file for complete search history.

(56) References Cited

OTHER PUBLICATIONS

Anonymous: "Brickwork: Difference between revisions—Wikipedia", Apr. 11, 2015 (Apr. 11, 2015), Retrieved from the Internet: URL:https://en.wikipedia.org/w/index.php?diff=655929181&oldid=655929083&title=Brickwork [retrieved on Feb. 1, 2018]; Cited in EESR.

Main scanning direction (a)

(b)

(c)

METHOD FOR FORMING THREE-DIMENSIONAL OBJECT, AND THREE-DIMENSIONAL PRINTER

TECHNICAL FIELD

The present invention relates to a method for forming a three-dimensional object and to a three-dimensional printer.

BACKGROUND ART

A method for forming a three-dimensional object, and a three-dimensional printer that form a three-dimensional object by extruding build material such as inks and depositing layers of the build material have been known. For example, in a method for forming a three-dimensional object, and a three-dimensional printer disclosed in patent document 1 described below, shape data for specifying a shape of the three-dimensional object and surface image data for indicating images of surfaces of the three-dimensional object constitute three-dimensional data, which is divided into a plurality of layers. In the method for forming the three-dimensional object, and the three-dimensional printer, based on cross-sectional slice information of each layer, extruders are caused to extrude inks as build material while moving along a print path in a main scanning direction. Then, after being moved in a sub-scanning direction by a distance corresponding to a single print path, the extruders are caused to extrude the inks as the build material while being moved along a print path in the main scanning direction. In this manner, in the method for forming the three-dimensional object, and the three-dimensional printer, the three-dimensional object is formed by repeating a step of extruding the inks while moving the extruders in the scanning direction and a step of moving the extruders in the sub-scanning direction.

RELATED ART DOCUMENTS

Patent Documents

Patent document 1: Japanese Unexamined Patent Application Publication No. 2004-130817.

DISCLOSURE OF THE INVENTION

Problems to be Solved by the Invention

In a case of the three-dimensional object formed by the three-dimensional printer disclosed in patent document 1 described above, the three-dimensional object is formed through deposition of the layers, and consequently, portions on boundaries between print paths are also deposited. This may cause streaks (grooves) parallel to the main scanning direction (first direction) to be generated on the three-dimensional object.

The present invention has been achieved in consideration of the above-described circumstances. It is an object of the present invention to provide a method for forming a three-dimensional object, and a three-dimensional printer that eliminate or minimize generation of streaks, which are parallel to the first direction, on the three-dimensional object.

Means of Solving the Problems

In order to solve the above-described problem and achieve the object, a method for forming a three-dimensional object according to the present invention includes: a slice information calculation step of dividing three-dimensional data that indicates a shape and a surface image of the three-dimensional object into a plurality of layers so as to calculate cross-sectional slice information of each of the layers; and a unit-layer formation step of forming each of the layers based on the cross-sectional slice information. The unit-layer formation step is repeated a plurality of times to deposit the layers so as to form the three-dimensional object by a three-dimensional printer. The unit-layer formation step includes a printing step of extruding inks onto a deposited surface to form a single print path extending in a first direction. At the printing step, a plurality of print paths are formed in a second direction that intersects the first direction so as to form each of the layers, and the print paths are formed in such a manner that a boundary between the print paths between each adjacent pair of the layers in a deposition direction of the layers is at least partly deviated in the second direction.

At the unit-layer formation step of the present invention, the print paths are formed in such a manner that between the deposited layers on top of each other, the print paths are at least partly displaced from each other in the second direction so as to form each of the layers. Consequently, it is ensured that in deposition of the layers, the boundaries between the print paths are prevented from being formed continuously in the deposition direction, and that streaks parallel to the first direction are prevented from being generated on the produced three-dimensional object.

In the above-described method for forming the three-dimensional object, at the unit-layer formation step, extruders configured to extrude the inks onto the deposited surface may be configured to extrude the inks a plurality of times from a plurality of nozzles, which are arrayed in the second direction, at each position in each of the layers so as to form each of the layers. Also, the extruders may be configured to be driven by nozzle extrusion control in which the print paths are set in such a manner that the boundaries between the print paths extend diagonally with respect to the first direction.

At the unit-layer formation step in the present invention, since the print paths are set in such a manner that the boundaries between the print paths extend diagonally with respect to the first direction, the boundaries between the print paths are diagonal with respect to the first direction. This makes streaks inconspicuous even if the streaks are generated along the boundaries between the print paths. It is preferable that between the layers deposited on top of each other, the directions in which the boundaries between the print paths extend be different from each other. In this case, it is ensured that streaks parallel to the first direction are prevented from being generated on the produced three-dimensional object. In addition, it is ensured that the produced three-dimensional object and, in particular, its upper surface, for example, is made flat.

In the above-described method for forming the three-dimensional object, at the unit-layer formation step, extruders configured to extrude the inks onto the deposited surface may be configured to extrude the inks a plurality of times from a plurality of nozzles, which are arrayed in the second direction, at each position in each of the layers so as to form each of the layers. Also, the extruders may be configured to be driven by nozzle extrusion control in which extrusion duties from the nozzles of the extruders in the first direction are changed to make a width of the print paths in the second direction change in the first direction.

At the unit-layer formation step in the present invention, since the width of the print paths in the sub-scanning direction can be changed in the first direction, the boundaries between the print paths are diagonal with respect to the first direction. This makes streaks inconspicuous even if the streaks are generated along the boundaries between the print paths. Extrusion duties at the boundary portions are particularly changed to prevent the boundaries from being continuous, and consequently, generation of continuous streaks is eliminated or minimized. It is preferable that between the layers deposited on top of each other, cycles of changes in the extrusion duties of the extruders be deviated. In this case, it is ensured that streaks parallel to the first direction are prevented from being generated on the produced three-dimensional object. In addition, it is ensured that the produced three-dimensional object and, in particular, its upper surface, for example, is made flat.

The above-described method for forming the three-dimensional object may further include a processing determination step of making a determination as to whether to perform the nozzle extrusion control for each part of the cross-sectional slice information. At the unit-layer formation step, the extruders may be configured to be driven by the nozzle extrusion control when the layers are formed based on part of the cross-sectional slice information as to which a determination has been made to perform the nozzle extrusion control at the processing determination step.

The present invention further includes the processing determination step of making a determination as to whether to perform the nozzle extrusion control for each part of the cross-sectional slice information based on the cross-sectional slice information. Consequently, the present invention ensures that the nozzle extrusion control is made to be performed or not to be performed in accordance with, for example, a shape and color depths of a surface image of each of the layers. This ensures that the three-dimensional object is formed with higher accuracy.

In the above-described method for forming the three-dimensional object, at the unit-layer formation step, when the layers are formed based on part of the cross-sectional slice information as to which a determination has been made not to perform the nozzle extrusion control at the processing determination step, the extruders may be configured to be driven to form the print paths in such a manner that the boundaries between the print paths are parallel to the first direction.

In the present invention, when a determination is made not to perform the nozzle extrusion control, the print paths are set to be parallel to the first direction. Consequently, when the inks are extruded along each print path, the inks are simultaneously extruded from nozzles as many as possible among the plurality of nozzles of the extruders. Therefore, it is ensured that the inks are extruded from many of the nozzles to improve ink-landing accuracy so as to form details of the three-dimensional object with high accuracy.

In the above-described method for forming the three-dimensional object, a plurality of nozzle arrays each including the plurality of nozzles arrayed in the second direction may be provided, and the nozzle extrusion control may be performed for each of the nozzle arrays as a unit.

In the present invention, since the nozzle extrusion control is performed for each of the nozzle arrays as a unit, a setting as to whether to perform the nozzle extrusion control is made for each kind of the inks extruded from the nozzle arrays. Accordingly, a setting as to whether to perform the nozzle extrusion control is made for each of a model portion, a color portion, and a clear portion in each layer of the three-dimensional object. Therefore, it is ensured that the nozzle extrusion control is appropriately performed to form the three-dimensional object with higher accuracy.

In the above-described method for forming the three-dimensional object, the three-dimensional data may include surface image data indicating surface colors of the three-dimensional object, and at the processing determination step, a determination may be made as to whether to perform the nozzle extrusion control based on the surface image data, which is the part of the cross-sectional slice information.

In the present invention, a determination as to whether to perform the nozzle extrusion control is made based on the surface image data of the cross-sectional slice information. Consequently, it is ensured that a determination as to whether to perform the nozzle extrusion control is appropriately made in accordance with, for example, the surface color depths of the three-dimensional object. For example, when the surface color of the three-dimensional object is deep, the nozzle extrusion control is performed, and when the surface color of the three-dimensional object is light, the nozzle extrusion control is not performed. As a result, it is ensured that ink-landing accuracy of the inks is improved in portions of the three-dimensional object where the surface color is light, and generation of streaks parallel to the main scanning direction is suppressed in portions of the three-dimensional object where the surface color is deep.

In the above-described method for forming the three-dimensional object, at the processing determination step, when a determination is made as to whether to perform the nozzle extrusion control for each part of the cross-sectional slice information, a shape indicated by part of the cross-sectional slice information as to which a determination is made as to whether to perform the nozzle extrusion control may be compared with a shape indicated by part of the cross-sectional slice information of one layer formed right afterward, and a determination may be made to perform the nozzle extrusion control as to a region of the part of the cross-sectional slice information as to which the determination is made as to whether to perform the nozzle extrusion control, which region overlaps the part of the cross-sectional slice information of the one layer formed right afterward.

In the present invention, when forming the region of the cross-sectional slice information that overlaps the cross-sectional slice information of the one layer formed right afterward, the nozzle extrusion control is performed. Consequently, in each portion where the layers of the three-dimensional object are deposited on top of each other, for example, it is ensured that deposition of the boundaries between the print paths is prevented to improve formation accuracy of the upper layer.

In the above-described method for forming the three-dimensional object, at the unit-layer formation step, when forming at least some of the print paths, the extruders may be configured to extrude the inks from all of the plurality of nozzles arrayed in the second direction, and the print paths may be formed in such a manner that the entire boundaries between the print paths between each pair of the layers adjacent to each other in the deposition direction of the layers are deviated in the second direction.

In the present invention, the print paths are formed in such a manner that the boundaries between the print paths are deviated in the second direction between the layers deposited on top of each other. Consequently, in depositing the layers, it is ensured that the print paths are prevented from being deposited on top of each other. This ensures that streaks parallel to the first direction are prevented from being generated on the produced three-dimensional object.

A three-dimensional printer according to the present invention is a three-dimensional printer to form a three-dimensional object based on three-dimensional data indicating a shape and a surface image of the three-dimensional object. The three-dimensional printer includes extruders and a controller. The extruders are configured to extrude inks for forming the three-dimensional object onto a deposited surface. The controller is configured to control the extruders and the relative movers. The controller is configured to perform a slice information calculation step of dividing the three-dimensional data into a plurality of layers and calculating cross-sectional slice information of each of the layers, and a unit-layer formation step of forming each of the layers based on the cross-sectional slice information. The controller is configured to repeat the unit-layer formation step a plurality of times and deposit the layers so as to form the three-dimensional object. At the unit-layer formation step, a printing step is performed to form a print path extending in a first direction by the extruders, and to form a plurality of the print paths in a second direction intersecting the first direction so as to form each of the layers. The print paths are formed in such a manner that between each adjacent pair of the layers in a deposition direction of the layers, a boundary between the print paths is at least partly deviated in the second direction.

In the present invention, the print paths are formed in such a manner that between the deposited layers on top of each other, the print paths are at least partly displaced from each other in the second direction so as to form each of the layers. Consequently, in deposition of the layers, it is ensured that the boundaries between the print paths are prevented from being continuous in the deposition direction, and streaks parallel to the main scanning direction are prevented from being generated on the produced three-dimensional object.

Effects of the Invention

The method for forming the three-dimensional object, and the three-dimensional printer according to the present invention produce an effect of suppressing generation of streaks parallel to the first direction on the produced three-dimensional object.

BRIEF DESCRIPTION OF THE DRAWINGS

FIG. 11(a) is a diagram illustrating an exemplary configuration of an extruder. FIG. 11(b) is a diagram illustrating an exemplary method for extruding ink to each position on a work surface a plurality of times.

FIG. 12(a) is a diagram illustrating the nozzles divided into ink extrusion regions. FIG. 12(b) is a diagram illustrating an exemplary change of a boundary between print paths in accordance with a change in a position of each ink extrusion region.

FIG. 15(a) is a plan view of a state of forming an n-th layer L at the unit-layer formation step in the method for forming the three-dimensional object according to modification 3 of the embodiment. FIG. 15(b) is a plan view of a state of forming an n+1-th layer L at the unit-layer formation step in the method for forming the three-dimensional object according to modification 3 of the embodiment. FIG. 15(c) is a plan view of another exemplary state of forming an n+1-th layer L at the unit-layer formation step in the method for forming the three-dimensional object according to modification 3 of the embodiment.

MODES FOR CARRYING OUT THE INVENTION

An embodiment of a method for forming a three-dimensional object, and a three-dimensional printer according to the present invention will be described in detail below with reference to the drawings. It should be noted that this embodiment is not intended in a sense limiting the present invention. The elements and/or components described in the embodiment encompass those elements and/or components readily found by one of ordinary skill in the art as replacements, and encompass substantially identical elements and/or components.

Embodiment

Figure 1:
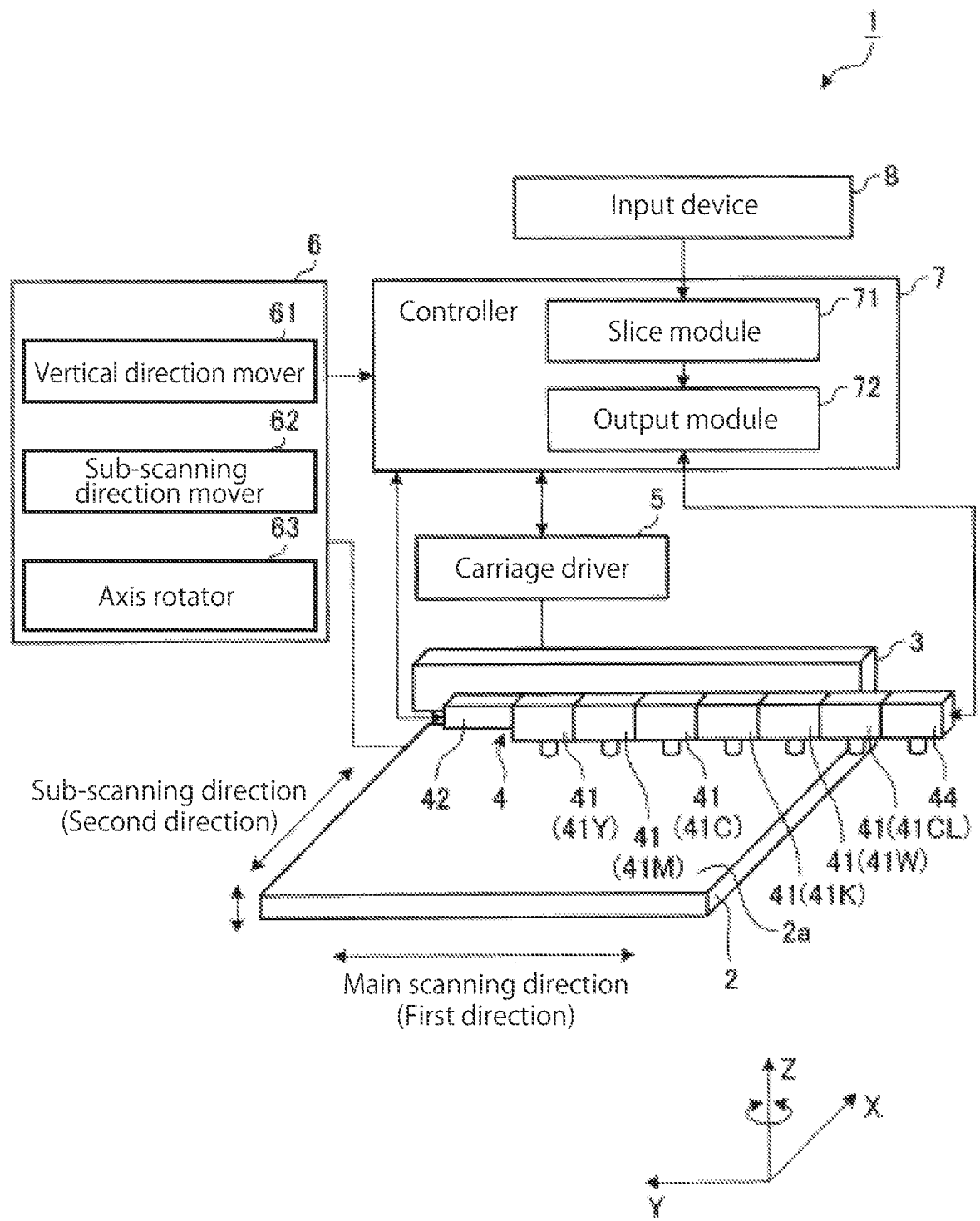
FIG. 1 is a schematic structural diagram illustrating a schematic configuration of an ink-jet printer according to an embodiment.
Figure 2:
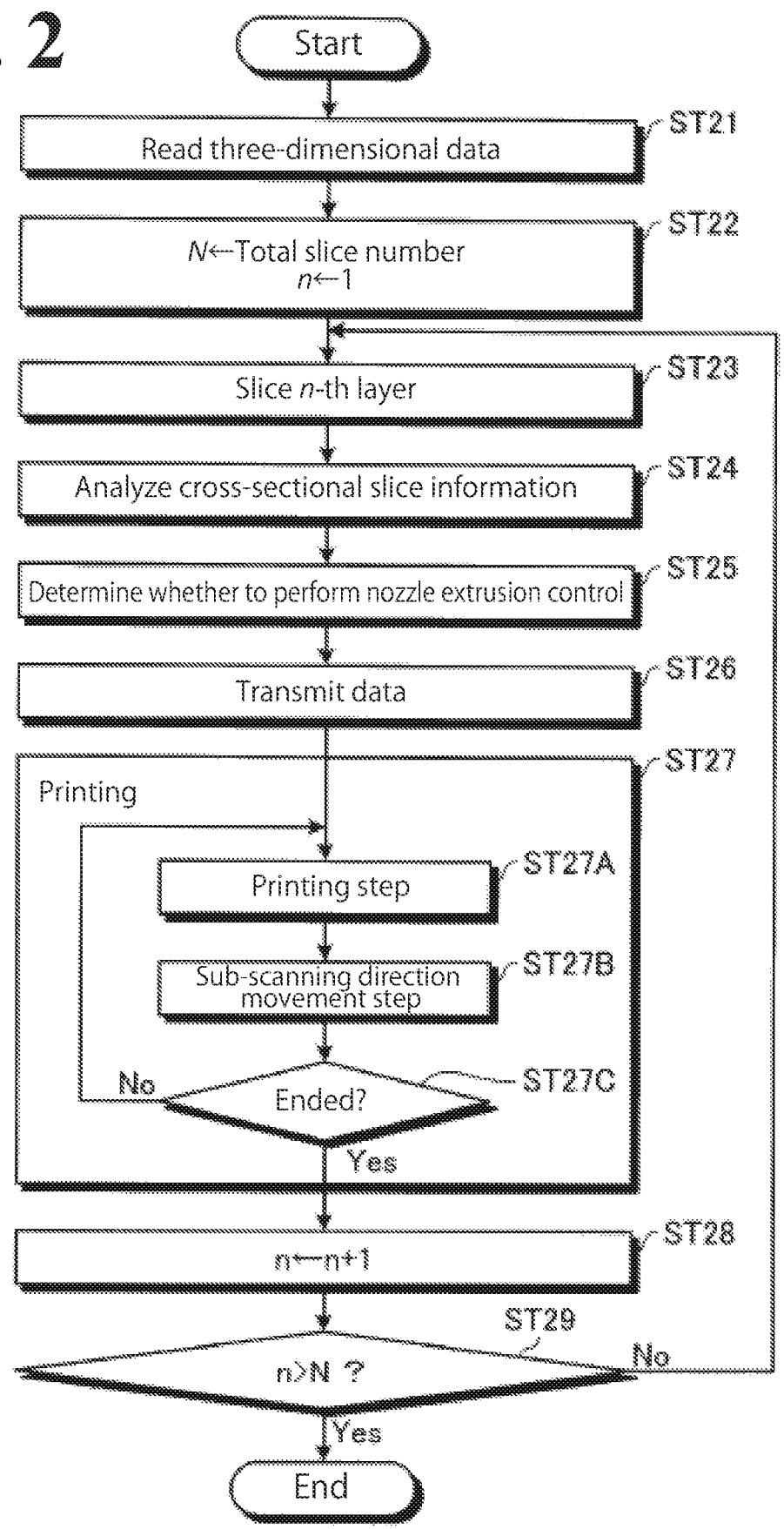
FIG. 2 is an exemplary flowchart of a method for forming a three-dimensional object according to the embodiment.
Figure 3:
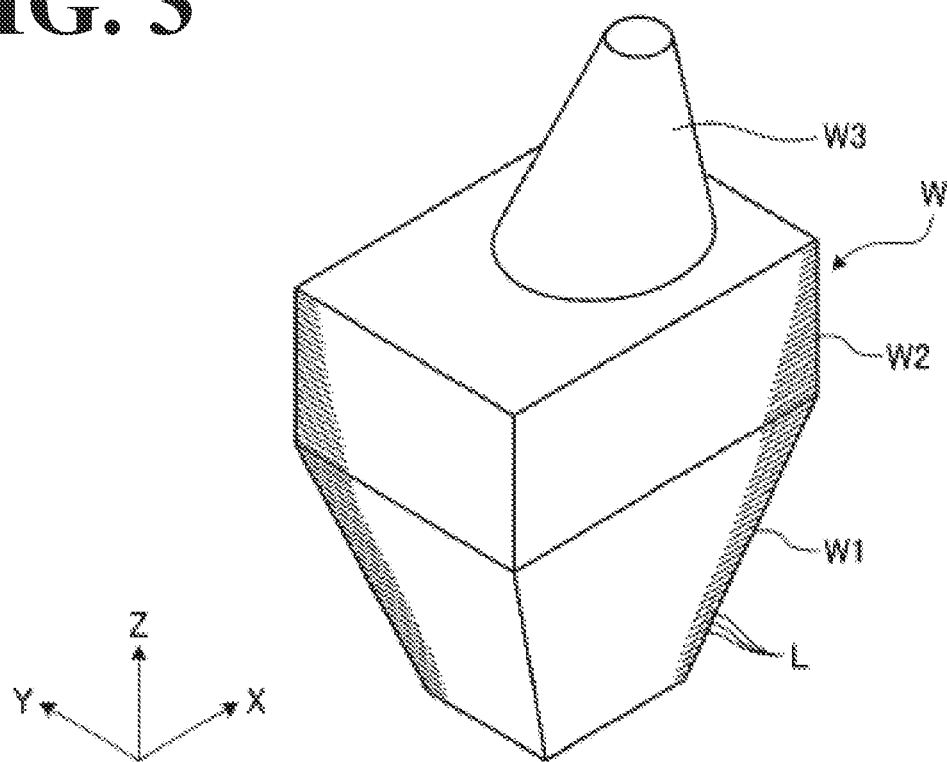
FIG. 3 is a perspective view of an exemplary three-dimensional object formed by the ink-jet printer illustrated in FIG. 1.
Figure 4:
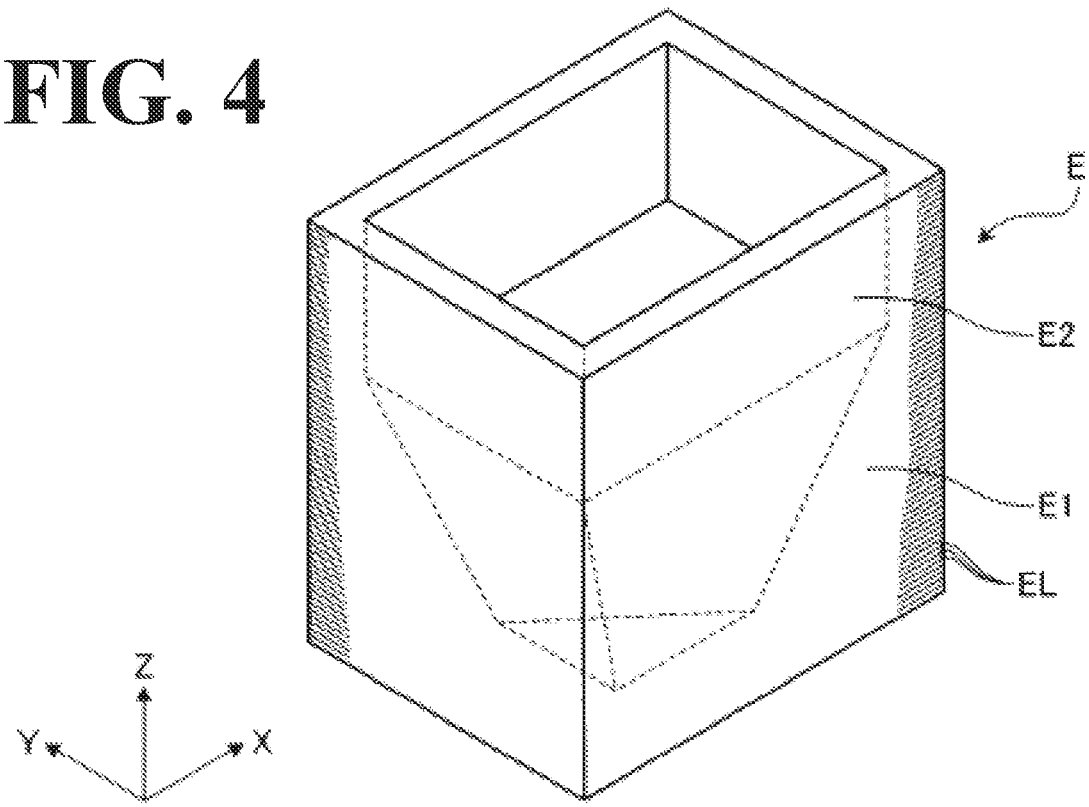
FIG. 4 is a perspective view of an exemplary support body used in forming the three-dimensional object illustrated in FIG. 3.
Figure 5:
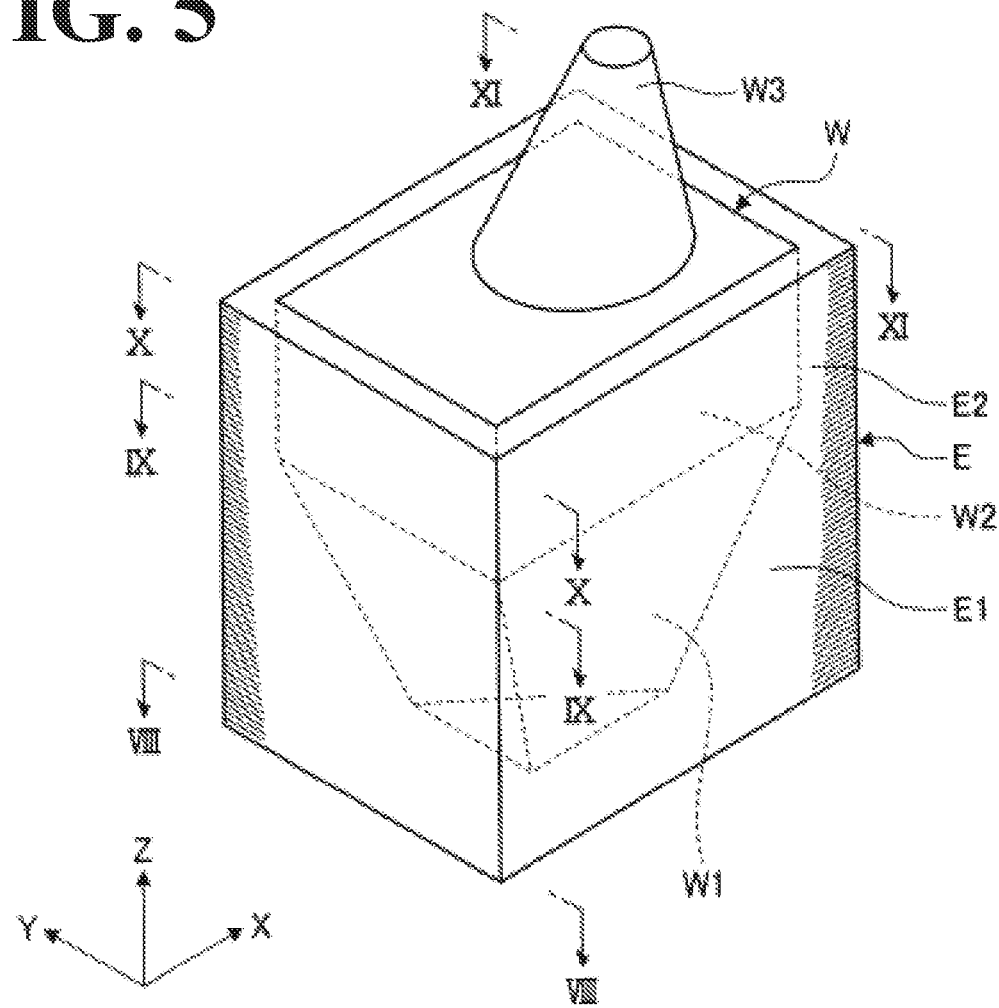
FIG. 5 is a perspective view of a state of the three-dimensional object formed with the support body illustrated in FIG. 4.
Figure 6:
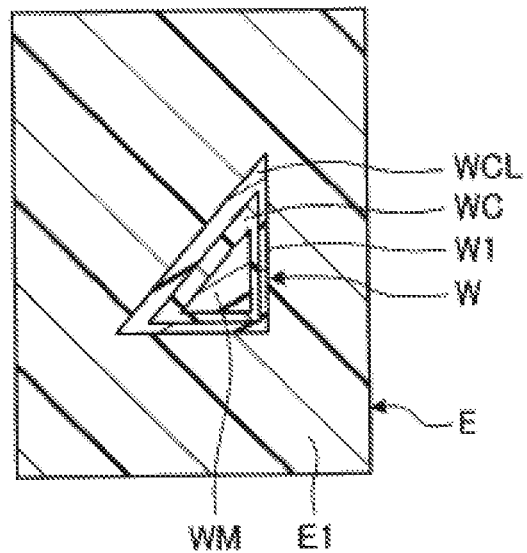
FIG. 6 is a cross-sectional view taken along the line VIII-VIII in FIG. 5.
Figure 7:
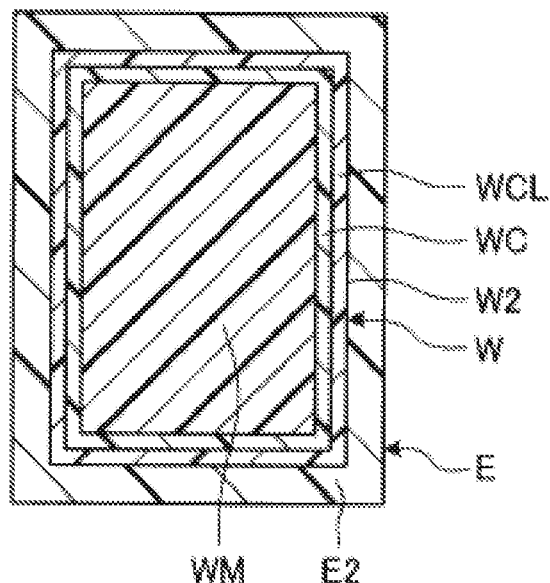
FIG. 7 is a cross-sectional view taken along the line IX-IX in FIG. 5.
Figure 8:
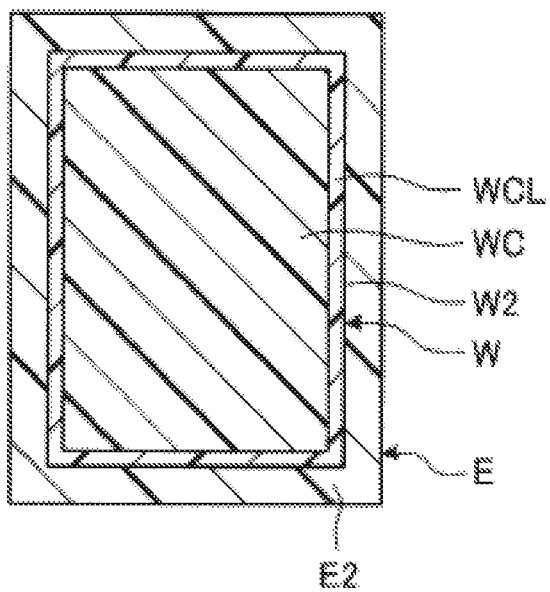
FIG. 8 is a cross-sectional view taken along the line X-X in FIG. 5.
Figure 9:
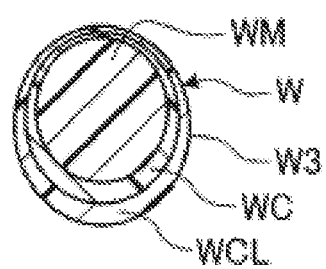
FIG. 9 is a cross-sectional view taken along the line XI-XI in FIG. 5.

FIG. 1 is a schematic structural diagram illustrating a schematic configuration of an ink-jet printer according to an embodiment. FIG. 2 is an exemplary flowchart of a method for forming a three-dimensional object according to the embodiment. FIG. 3 is a perspective view of an exemplary three-dimensional object formed by the ink-jet printer illustrated in FIG. 1. FIG. 4 is a perspective view of an exemplary support body used in forming the three-dimensional object illustrated in FIG. 3. FIG. 5 is a perspective view of a state of the three-dimensional object formed with the support body illustrated in FIG. 4. FIG. 6 is a cross-sectional view taken along the line VIII-VIII in FIG. 5. FIG. 7 is a cross-sectional view taken along the line IX-IX in FIG. 5. FIG. 8 is a cross-sectional view taken along the line X-X in FIG. 5. FIG. 9 is a cross-sectional view taken along the line XI-XI in FIG. 5.

The ink-jet printer 1 as the three-dimensional printer according to the embodiment illustrated in FIG. 1 is a three-dimensional-object forming apparatus to produce a three-dimensional object W (an example of which is illustrated in FIG. 3), which is a three-dimensional solid object, using what is called ink-jet technology. Typically, this ink-jet printer 1 divides the three-dimensional object W into a large number of layers L (illustrated in FIG. 3) in a vertical direction based on three-dimensional data that indicates a shape and a surface image of the three-dimensional object W. Based on shape data indicating a shape of each of the layers L of the three-dimensional object W and surface image data indicating the surface image, the ink-jet printer 1 deposits build material (cured ink) in sequence from lower layers L so as to form the three-dimensional object W in accordance with its three-dimensional data.

As illustrated in FIG. 6 to FIG. 9, the three-dimensional object W includes a model portion WM, a color portion WC, and a clear portion WCL. The model portion WM is formed of white (W: White) ink. The color portion WC is formed on a surface of the model portion WM and formed of at least one of yellow (Y: Yellow) ink, magenta (M: Magenta) ink, cyan (C: Cyan) ink, and black (K) ink. The clear portion WCL covers the color portion WC and is formed of transparent ink.

The three-dimensional object W one example of which is illustrated in FIG. 3 integrally includes an enlarged portion W1, a cuboid portion W2, and a protruding portion W3. The enlarged portion W1 has a cross-sectional shape gradually enlarged toward an upper side of FIG. 3. The cuboid portion W2 is continuous to an upper end of the enlarged portion W1 in FIG. 3 and has a rectangular-parallelepiped shape. The protruding portion W3 protrudes from an upper end of the cuboid portion W2 in FIG. 3. The enlarged portion W1 has a triangular cross-sectional shape. The cuboid portion W2 has a rectangular cross-sectional shape. The protruding portion W3 has a circular cross-sectional shape and an outer appearance of a truncated cone shape. In the present invention, however, a shape of the three-dimensional object W is not limited to this shape.

As illustrated in FIG. 1, the ink-jet printer 1 includes, for example, a platform 2, a Y bar 3, a carriage 4, a carriage driver 5 (equivalent to the relative mover), a platform driver 6 (equivalent to the relative mover), a controller 7, and an input device 8. The platform 2 has an upper surface serving as a work surface 2a (equivalent to the deposited surface). The Y bar 3 extends in a main scanning direction (equivalent to the first direction).

The work surface 2a of the platform 2 is formed flat in a horizontal direction (a direction parallel to both of the X-axis and the Y-axis in FIG. 1). The work surface 2a is a flat surface on which layers of ink, which is build material, are deposited in sequence from lower layers L. The platform 2 has, for example, an approximately rectangular shape but is not limited to this shape.

The Y bar 3 is disposed on an upper side of the platform 2 in the vertical direction at a predetermined interval from the platform 2. The Y bar 3 extends straight in the main scanning direction parallel to the horizontal direction (the Y-axis). The Y bar 3 guides reciprocation of the carriage 4 in the main scanning direction.

The carriage 4 is held by the Y bar 3 and is reciprocatively movable in the main scanning direction along the Y bar 3. The carriage 4 is controlled to move in the main scanning direction. On a surface of the carriage 4 opposed to the platform 2 in the vertical direction, a support ink extruder 44, a plurality of extruders 41, and an ultraviolet irradiator 42 are disposed through, for example, holders not illustrated.

The support ink extruder 44 extrudes support ink onto the work surface 2a. The support ink changes in a cure degree when exposed to light. The support ink extruder 44 in the embodiment is at least capable of extruding the support ink, which is an ink that changes in the cure degree by exposure, to form a support body E (illustrated in FIG. 4), which is formed along an outline of the three-dimensional object W, and capable of moving relative to the work surface 2a by the carriage driver 5.

It should be noted that the support body E has inner surfaces of a shape along outer surfaces of the three-dimensional object W. When no other layer L of the three-dimensional object W exists under a layer L in a deposition direction, the support body E serves to support the layer L concerned. The support body E also serves to make flat the outer side surfaces of the three-dimensional object W.

In this embodiment, as illustrated in FIG. 4, the support body E includes an enlarged inclined portion E1 and a vertical portion E2 integral to each other. The enlarged inclined portion E1 has a shape along outer side surfaces of the enlarged portion W1 of the three-dimensional object W. The vertical portion E2 has a shape along outer side surfaces of the cuboid portion W2. The support body E is formed in such a manner that the enlarged inclined portion E1 supports layers L of the three-dimensional object W, and that the vertical portion E2 makes flat the outer side surfaces of the three-dimensional object W.

The support ink extruder 44 is reciprocatively movable in the main scanning direction along with movement of the carriage 4 in the main scanning direction. The support ink extruder 44 is connected to an ink tank through, for example, various kinds of ink passages, a regulator, and a pump. In accordance with the number of ink tanks, that is, the number of kinds of support ink that can be extruded simultaneously, for example, a single support ink extruder 44 or a plurality of support ink extruders 44 are provided. The support ink extruder 44 is an ink-jet extruder capable of extruding support ink in the ink tank onto the work surface 2a in ink-jet technology.

As the support ink that changes in the cure degree by exposure, for example, UV (UltraViolet: ultraviolet light) curable ink that cures when irradiated with ultraviolet light may be used. Preferably, the UV effect ink should have high water solubility, high alcohol solubility, and heat solubility after cured. The support ink extruder 44 is electrically connected to the controller 7, and drive of the support ink extruder 44 is controlled by the controller 7.

The extruders 41 extrude, onto the work surface 2a, inks that change in the cure degree by exposure and serve as the build material for forming the three-dimensional object W. The extruders 41 in the embodiment are at least capable of extruding the inks, which change in the cure degree by exposure, onto the work surface 2a and capable of moving relative to the work surface 2a by the carriage driver 5.

The extruders 41 are reciprocatively movable in the main scanning direction along with movement of the carriage 4 in the main scanning direction. The extruders 41 are connected to ink tanks through, for example, various kinds of ink passages, regulators, and pumps. The extruders 41 are provided in accordance with the number of ink tanks, that is, the number of kinds of colors of inks that can be extruded simultaneously.

As illustrated in FIG. 1, in this embodiment, the extruders 41 include extruders 41Y, 41M, 41C, 41K, 41W, and 41CL. The extruder 41Y extrudes yellow (Y) ink. The extruder 41M extrudes magenta (M) ink. The extruder 41C extrudes cyan (C) ink. The extruder 41K extrudes black (K) ink. The extruder 41W extrudes white (W) ink. The extruder 41CL extrudes clear (CL: Clear) ink.

The extruders 41Y, 41M, 41C, 41K, 41W, and 41CL are ink-jet extruders capable of extruding the inks in the ink tanks onto the work surface 2a in ink-jet technology. Preferably, as the ink that changes in the cure degree when exposed to light, for example, UV (ultraviolet light) curable inks that cure when irradiated with ultraviolet light be used. The extruders 41Y, 41M, 41C, 41K, 41W, and 41CL are electrically connected to the controller 7, and drive of the extruders 41Y, 41M, 41C, 41K, 41W, and 41CL is controlled by the controller 7. The extruders 41Y, 41M, 41C, 41K, 41W, and 41CL are arranged in a row in the Y-axis direction. As described above, the ink-jet printer 1 includes the extruders 41Y, 41M, 41C, 41K, 41W, and 41CL to at least extrude inks of the three primary colors.

As illustrated in FIG. 11(a), the extruders 41Y, 41M, 41C, 41K, 41W, and 41CL and the support ink extruder 44 each include a plurality of nozzles 302 arrayed in a constant density in a sub-scanning direction (equivalent to the second direction). While moving in the main scanning direction, the extruders 41Y, 41M, 41C, 41K, 41W, and 41CL, and the support ink extruder 44 extrude the inks from these nozzles 302 so as to form the three-dimensional object W and the support body E. As described above, since each of the extruders 41Y, 41M, 41C, 41K, 41W, and 41CL, and the support ink extruder 44 includes the plurality of nozzles 302 arrayed in the constant density in the sub-scanning direction, the ink-jet printer 1 includes a plurality of nozzle arrays 303 each including the plurality of nozzles 302 arrayed in the sub-scanning direction.

In this embodiment, the nozzle density d of each array of nozzles 302 is lower than a printing resolution. Consequently, an identical position on the work surface 2a is formed of a plurality of print paths a plurality of times so as to obtain a desired printing resolution. Each time the work surface 2a is transferred in the sub-scanning direction by a distance corresponding to a band width, which is a width of the print paths 50 (illustrated in FIG. 10) shorter than the length of the nozzle arrays 303 in the sub-scanning direction, the extruders 41Y, 41M, 41C, 41K, 41W, and 41CL, and the support ink extruder 44 repeat extrusion of the inks to extrude the inks onto the identical position a plurality of times.

The ultraviolet irradiator 42 provides external stimulus for the inks and the support ink extruded onto the work surface 2a.

The ultraviolet irradiator 42 is capable of irradiating the inks and the support ink extruded onto the work surface 2a with ultraviolet light (UV). The inks and the support ink extruded onto the work surface 2a are irradiated with ultraviolet light to expose the inks and the support ink to light. The ultraviolet irradiator 42 includes, for example, an LED module capable of emitting ultraviolet light. The ultraviolet irradiator 42, which is disposed on the carriage 4, is reciprocatively movable in the main scanning direction along with the movement of the carriage 4 in the main scanning direction. The ultraviolet irradiator 42 is electrically connected to the controller 7, and drive of the ultraviolet irradiator 42 is controlled by the controller 7.

The carriage driver 5 is a drive device to cause the carriage 4, that is, the extruders 41Y, 41M, 41C, 41K, 41W, and 41CL, the support ink extruder 44, and the ultraviolet irradiator 42, to reciprocate in the main scanning direction relative to the Y bar 3.

The carriage driver 5 includes, for example, a transmission mechanism and a drive source. The transmission mechanism such as a conveyance belt is coupled to the carriage 4. The drive source such as an electric motor drives the conveyance belt. Through the transmission mechanism, the carriage driver 5 converts motive power generated by the drive source into motive power to move the carriage 4 in the main scanning direction so as to reciprocate the carriage 4 in the main scanning direction.

The carriage driver 5 is electrically connected to the controller 7, and drive of the carriage driver 5 is controlled by the controller 7.

The carriage driver 5 and the platform driver 6 cause the extruders 41Y, 41M, 41C, 41K, 41W, and 41CL, and the work surface 2a to move relative to each other.

As illustrated in FIG. 1, the platform driver 6 includes a vertical direction mover 61, a sub-scanning direction mover 62, and an axis rotator 63. The vertical direction mover 61 moves the platform 2 up and down in the vertical direction parallel to the Z-axis so as to move the work surface 2a on the platform 2 up and down in the vertical direction relative to the extruders 41Y, 41M, 41C, 41K, 41W, and 41CL, the support ink extruder 44, and the ultraviolet irradiator 42. Thus, the platform driver 6 causes the work surface 2a to move in the vertical direction close to and away from the extruders 41Y, 41M, 41C, 41K, 41W, and 41CL, the support ink extruder 44, and the ultraviolet irradiator 42. That is, the platform driver 6 makes the work surface 2a movable in the vertical direction relative to the extruders 41Y, 41M, 41C, 41K, 41W, and 41CL, the support ink extruder 44, and the ultraviolet irradiator 42.

The sub-scanning direction mover 62 moves the platform 2 in the sub-scanning direction parallel to the X-axis perpendicular to the main scanning direction so as to reciprocate the work surface 2a on the platform 2 in the sub-scanning direction relative to the extruders 41Y, 41M, 41C, 41K, 41W, and 41CL, the support ink extruder 44, and the ultraviolet irradiator 42. Thus, the platform driver 6 causes the work surface 2a to reciprocate in the sub-scanning direction relative to the extruders 41Y, 41M, 41C, 41K, 41W, and 41CL, the support ink extruder 44, and the ultraviolet irradiator 42. That is, the sub-scanning direction mover 62 makes the extruders 41Y, 41M, 41C, 41K, 41W, and 41CL, the support ink extruder 44, and the ultraviolet irradiator 42 as one group, and the work surface 2a reciprocatively movable in the sub-scanning direction relative to each other.

In the embodiment, the sub-scanning direction mover 62 moves the platform 2 in the sub-scanning direction. In the present invention, however, this should not be construed in a limiting sense. The sub-scanning direction mover 62 may move the extruders 41Y, 41M, 41C, 41K, 41W, and 41CL, the support ink extruder 44, and the ultraviolet irradiator 42 along with the Y bar 3 in the sub-scanning direction.

The axis rotator 63 rotates the platform 2 about the axis (Z-axis) parallel to the vertical direction so as to rotate the work surface 2a on the platform 2 about the axis relative to the extruders 41Y, 41M, 41C, 41K, 41W, and 41CL, the support ink extruder 44, and the ultraviolet irradiator 42.

Thus, the platform driver 6 causes the work surface 2a to rotate about the axis relative to the extruders 41Y, 41M, 41C, 41K, 41W, and 41CL, the support ink extruder 44, and the ultraviolet irradiator 42. That is, the axis rotator 63 makes the extruders 41Y, 41M, 41C, 41K, 41W, and 41CL, the support ink extruder 44, and the ultraviolet irradiator 42, and the work surface 2a rotatable about the axis parallel to the vertical direction.

The controller 7 controls components of the ink-jet printer 1 such as the extruders 41Y, 41M, 41C, 41K, 41W, and 41CL, the support ink extruder 44, the ultraviolet irradiator 42, the carriage driver 5, and the platform driver 6. The controller 7 includes hardware such as a processor and a memory, and programs for implementing predetermined functions of the hardware.

The controller 7 controls the extruders 41Y, 41M, 41C, 41K, 41W, and 41CL, and the support ink extruder 44 to control an extrusion amount, an extrusion timing, and an extrusion period of time, for example, of ink of each of the extruders 41Y, 41M, 41C, 41K, 41W, and 41CL, and the support ink extruder 44. The controller 7 controls the ultraviolet irradiator 42 to control an intensity of emitted ultraviolet light, an exposure timing, and an exposure period of time, for example.

The controller 7 controls the carriage driver 5 to control relative movement of the carriage 4 in the main scanning direction.

The controller 7 controls the platform driver 6 to control relative movement of the platform 2 in the vertical direction and the sub-scanning direction and relative movement of the platform 2 about the axis.

The controller 7 divides three-dimensional data input from the input device 8 into pieces of data corresponding to the respective layers L. The controller 7 includes a slice module 71 and an output module 72. The slice module 71 calculates cross-sectional slice information of each of the layers L. The output module 72, for example, analyzes the cross-sectional slice information.

The input device 8 is connected to the controller 7. Three-dimensional data indicating the shape and the surface image of the three-dimensional object W is input to the input device 8. The input device 8 includes, for example, a PC and various terminals connected to the controller 7 through wire or wirelessly.

Figure 10:
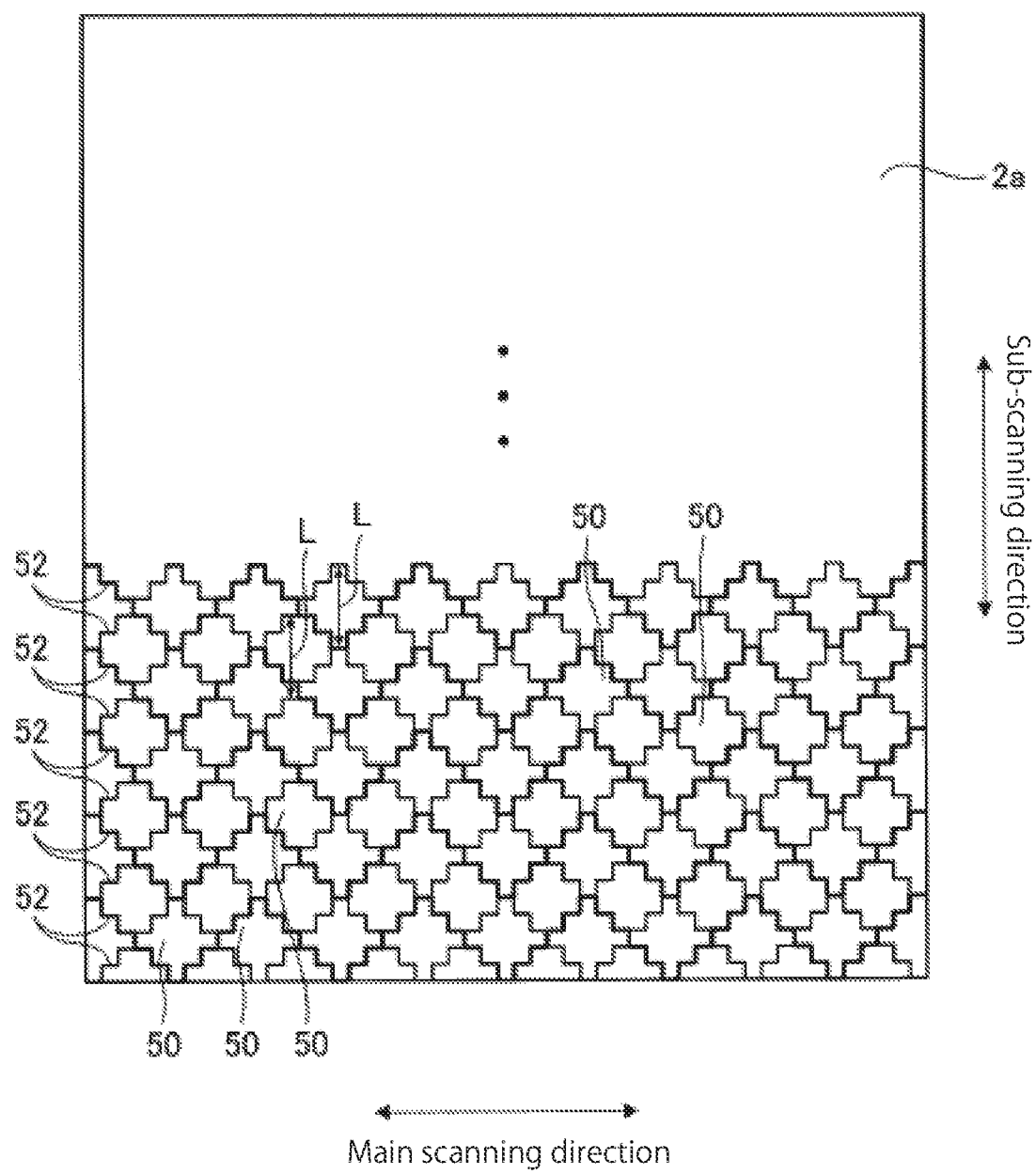
FIG. 10 is a plan view of exemplary print paths in nozzle extrusion control in the method for forming the three-dimensional object according to the embodiment.
Figure 11:
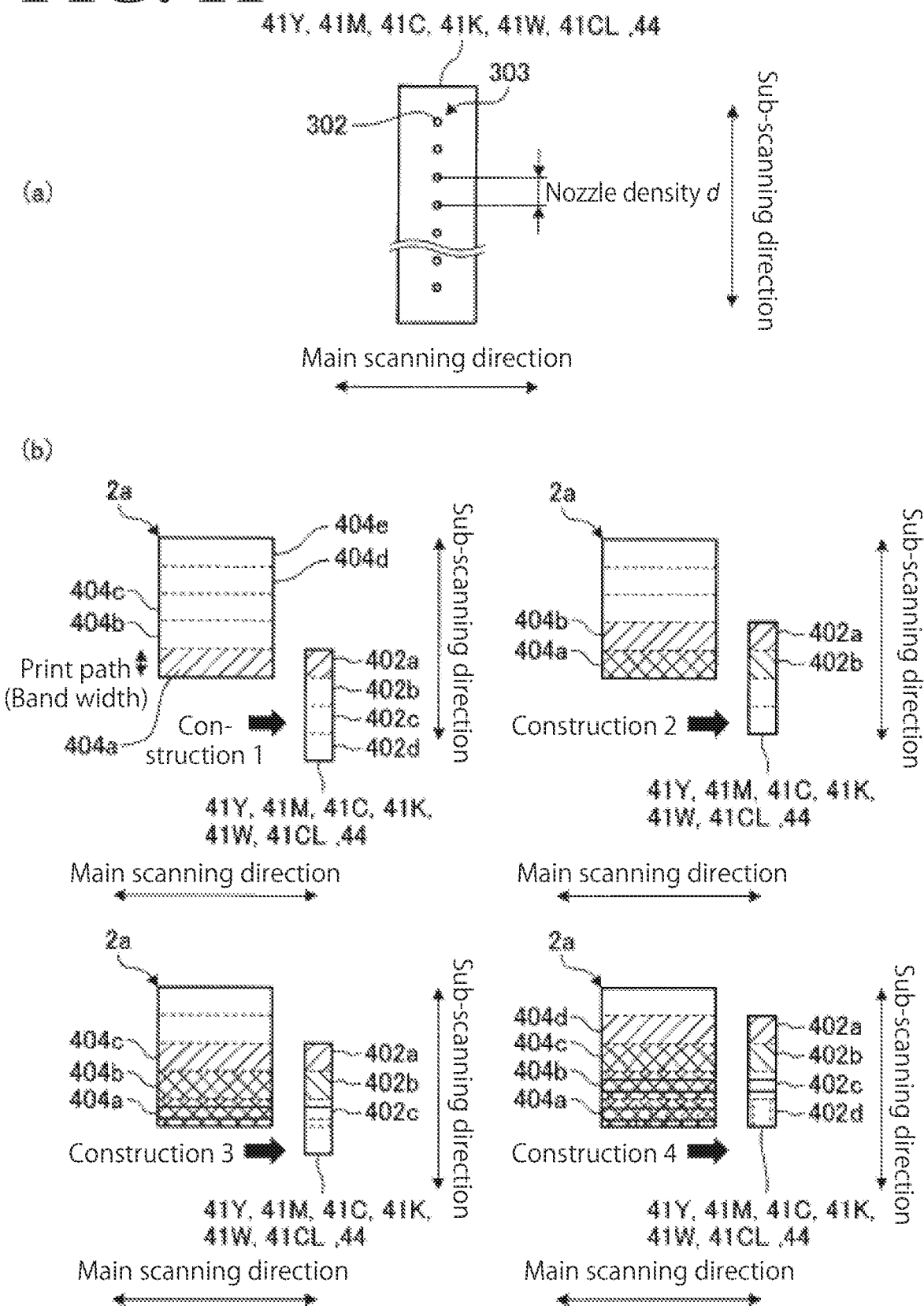
FIG. 11 is a diagram illustrating the nozzle extrusion control in the method for forming the three-dimensional object according to the embodiment.
Figure 12:
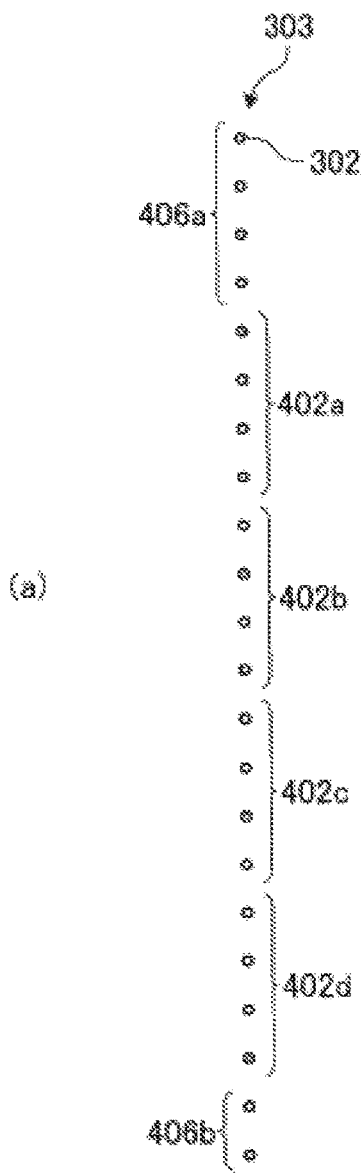
FIG. 12 is a diagram illustrating an exemplary correspondence between nozzles of the extruder in the nozzle extrusion control in the method for forming the three-dimensional object according to the embodiment, and print paths.
Figure 12:
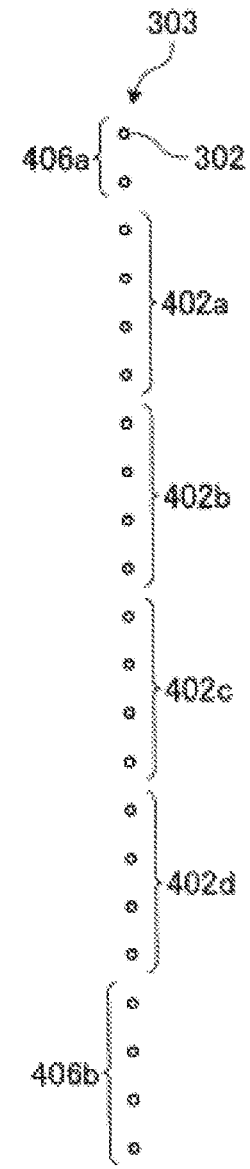
Figure 12:
Figure 12:
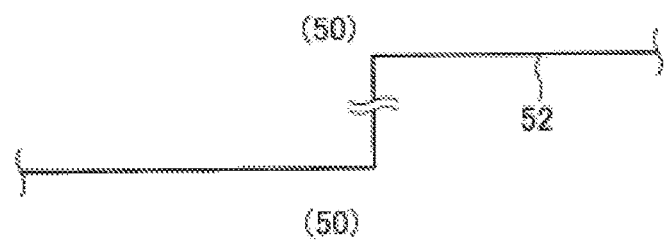

Next, by referring to the flowchart in FIG. 2, one example of the method for forming the three-dimensional object performed by the above-described ink-jet printer 1 will be described. The method for forming the three-dimensional object illustrated in FIG. 2 is performed by the controller 7 of the ink-jet printer 1. In the description of FIG. 2, FIG. 10 to FIG. 12 will be referred to as the occasion demands. FIG. 10 to FIG. 12 are diagrams illustrating the one example of the method for forming the three-dimensional object according to the embodiment.

The method for forming the three-dimensional object in the embodiment is a method for producing the three-dimensional object W.

This method for forming the three-dimensional object is performed by causing the controller 7 of the ink-jet printer 1 to control drive of each component of the ink-jet printer 1.

The method for forming the three-dimensional object includes a slice information calculation step (step ST23) and a unit-layer formation step (step ST27). At the slice information calculation step, three-dimensional data of the three-dimensional object W and the support body E is respectively divided into a plurality of layers L, EL so as to calculate cross-sectional slice information of the three-dimensional object W and cross-sectional slice information of the support body E in each of the layers L, EL. At the unit-layer formation step, each of the layers L, EL is formed based on the cross-sectional slice information of the three-dimensional object W and the cross-sectional slice information of the support body E. The unit-layer formation step (step ST27) is repeated a plurality of times to deposit the layers L, EL so as to form the three-dimensional object W by the ink-jet printer 1.

In the method for forming the three-dimensional object, while moving the extruders 41Y, 41M, 41C, 41K, 41W, and 41CL, the support ink extruder 44, and the ultraviolet irradiator 42 in the main scanning direction, each of the layers L, EL is formed of a plurality of print paths 50.

The method for forming the three-dimensional object in this embodiment adopts what is called multi-pass recording in which the inks and the support ink are extruded onto each position in each of the layers L, EL from the nozzles 302 a plurality of times.

This method for forming the three-dimensional object includes an operation of moving the work surface 2a in the sub-scanning direction by only a distance corresponding to the band width equal to a width of the print paths 50. The method also includes an operation of extruding the inks and the support ink while moving the extruders 41Y, 41M, 41C, 41K, 41W, and 41CL, the support ink extruder 44, and the ultraviolet irradiator 42 in the main scanning direction. These two operations are repeated to form the three-dimensional object W.

In the method for forming the three-dimensional object in the embodiment, first, three-dimensional data of the three-dimensional object W input from the input device 8 is read by the controller 7 connected to the input device 8 (step ST21). In the embodiment, the three-dimensional data includes shape data and surface image data. The shape data is data for specifying the shape of the three-dimensional object W and includes data indicating coordinates on the X-axis, the Y-axis, and the Z-axis, namely, three-dimensional coordinate data, of minute regions of the surfaces of the three-dimensional object W.

The surface image data is data indicating images (colors) of the surfaces of the three-dimensional object W and indicates an image profile of each of the minute regions in the shape data. The image profile indicates a depth of each of the colors yellow (Y), magenta (M), cyan (C), and black (K) in gradation of 256 levels or 65536 levels, for example.

Next, after reading the three-dimensional data (step ST21), the controller 7 calculates and generates shape data of the support body E based on the three-dimensional data.

Then, based on the shape data of the three-dimensional data and the size of ink droplets of the inks extruded from the extruders 41Y, 41M, 41C, 41K, 41W, and 41CL, the slice module 71 of the controller 7 calculates the number N of the layers L, EL that define the three-dimensional data of the three-dimensional object W and the support body E in the Z-axis direction (step ST22).

Specifically, the slice module 71 of the controller 7 calculates a height of the three-dimensional object W and the support body E in the Z-axis direction based on the shape data, and divides the calculated height by a height corresponding to a size of each ink droplet of the inks so as to calculate the number N of the layers L.

At step ST22, the controller 7 sets that n=1.

Next, the slice module 71 of the controller 7 performs the slice information calculation step (step ST23) at which the three-dimensional data is divided into pieces corresponding to the plurality of layers L, and cross-sectional slice information of each of the divided layers L, EL (the lowermost layer L, EL in a first loop from step ST23 to step ST29) is calculated.

The cross-sectional slice information of each of the layers L, EL, which has been calculated at the slice information calculation step (step ST23) by the slice module 71 of the controller 7, is the pieces of the three-dimensional data divided to correspond to the plurality of layers L, EL having the height in accordance with the size of the ink droplets of the inks extruded by the ink-jet printer 1.

It should be noted that in the first loop from step ST23 to step ST29, cross-sectional slice information of the lowermost layer L, EL is calculated. The cross-sectional slice information shows three-dimensional coordinate data that indicates coordinates of each minute region of each of the layers L on the X-axis, the Y-axis, and the Z-axis, and an image profile, namely, surface image data of each minute region of each of the layers L.

Next, the controller 7 causes the output module 72 to analyze the cross-sectional slice information of the three-dimensional object W and the cross-sectional slice information of the support body E (step ST24).

Specifically, based on the cross-sectional slice information of the three-dimensional object W, the output module 72 calculates, for example, an area, on the X-Y plane, of the model portion WM, and thicknesses (lengths in the sub-scanning direction) of the color portion WC and the clear portion WCL in each of the layers L formed based on each piece of the cross-sectional slice information.

Moreover, based on a plurality of pieces of the cross-sectional slice information of the support body E, which are continuous in the Z-axis direction, the output module 72 calculates an angle, relative to the X-Y plane, of the portion of the support body E that includes a plurality of layers EL and serves to form the outer surfaces of the three-dimensional object W. The output module 72 also calculates whether the three-dimensional object W exists on an upper side of each of the layers EL in the deposition direction. The area of the model portion WM on the X-Y plane, and the thicknesses of the color portion WC and the clear portion WCL are equivalent to the part of the cross-sectional slice information.

Next, based on the cross-sectional slice information calculated at the slice information calculation step (step ST23) and analyzed at step ST24, the controller 7 performs a processing determination step (step ST25) of making a determination as to every part of the cross-sectional slice information whether nozzle extrusion control is to be performed (required).

It should be noted that the nozzle extrusion control is control for suppressing generation of streaks (namely, banding) parallel to the main scanning direction on the surfaces of the three-dimensional object W.

In this embodiment, at this processing determination step (step ST25), (1) when the area of the model portion WM on the X-Y plane is equal to or larger than a predetermined value, the controller 7 makes a determination that the nozzle extrusion control is to be performed (required to be performed) in formation of the model portion WM, (2) when the thicknesses (lengths in the sub-scanning direction) of the color portion WC and the clear portion WCL are equal to or larger than predetermined values, the controller 7 makes a determination that the nozzle extrusion control is to be performed in formation of the color portion WC and the clear portion WCL, (3) when gradation of an image profile (equivalent to the surface image data, which is the part of the cross-sectional slice information) of the color portion WC has a value equal to or larger than a predetermined number of levels, that is, when the color of the color portion WC is deep, the controller 7 makes a determination that the nozzle extrusion control is to be performed in formation of the color portion WC, and (4) when an angle, relative to the X-Y plane, of the portion of the plurality of layers EL of the support body E that serves to form the outer surfaces of the three-dimensional object W is equal to or less than a predetermined value, the controller 7 makes a determination that the nozzle extrusion control is to be performed in formation of each of the plurality of layers EL of the support body E.

It should be noted that in this embodiment, the inner surfaces of the enlarged inclined portion E1 of the support body E have angles relative to the X-Y plane that are equal to or less than predetermined values, and the three-dimensional object W is formed along these inner surfaces. Consequently, the determination that the nozzle extrusion control is to be performed is made to suppress an influence on the three-dimensional object W caused by generation of streaks (namely, banding) parallel to the main scanning direction in the support body E.

Even if the angle, relative to the X-Y plane, of the portion of the plurality of layers EL of the support body E that serves to form the outer surfaces of the three-dimensional object W is larger than the predetermined value, and when the layers L of the three-dimensional object W are formed on an uppermost layer EL of the vertical portion E2 of the support body E in the deposition direction (Z direction), the controller 7 makes a determination that the nozzle extrusion control is to be performed in a manner similar to the case of the enlarged inclined portion E1.

At the processing determination step (step ST25), (1) when the area of the model portion WM on the X-Y plane is less than the predetermined value, the controller 7 makes a determination that the nozzle extrusion control is not to be performed (not required to be performed) in formation of the model portion WM, (2) when the thicknesses of the color portion WC and the clear portion WCL are less than the predetermined values, the controller 7 makes a determination that the nozzle extrusion control is not to be performed in formation of the color portion WC and the clear portion WCL, and (3) when gradation of the image profile of the color portion WC has a value less than the predetermined number of levels, that is, when the color of the color portion WC is light, the controller 7 makes a determination that the nozzle extrusion control is not to be performed in formation of the color portion WC.

As described above, in this embodiment, at the processing determination step (step ST25), the controller 7 makes a determination as to whether the nozzle extrusion control is to be performed (required) based on the surface image data of the cross-sectional slice information. Generally, in the three-dimensional object W, the area of the model portion WM on the X-Y plane is equal to or larger than the predetermined value in many cases (the area of the model portion WM on the X-Y plane is equal to or larger than the predetermined value). In formation of the model portion WM, therefore, the controller 7 makes a determination that the nozzle extrusion control is to be performed in many cases (the controller 7 makes a determination that the nozzle extrusion control is to be performed).

In the three-dimensional object W, since the thicknesses of the color portion WC and the clear portion WCL are less than the predetermined values in many cases (the thicknesses of the color portion WC and the clear portion WCL are less than the predetermined values), the controller 7 makes a determination that the nozzle extrusion control is not to be performed in formation of the color portion WC and the clear portion WCL in many cases (the controller 7 makes a determination that the nozzle extrusion control is not to be performed in formation of the color portion WC and the clear portion WCL).

In this embodiment, when the angle, relative to the X-Y plane, of the portion of the plurality of layers EL of the support body E that serves to form the outer surfaces of the three-dimensional object W exceeds the predetermined value, and when no layer L of the three-dimensional object W is formed on the uppermost layer EL of the vertical portion E2 of the support body E, the controller 7 makes a determination that the nozzle extrusion control is not to be performed in formation of each of the layers EL of the support body E. The reason is that when the surfaces of the support body E approximately perpendicular to the X-Y plane are formed, and when no layer L of the three-dimensional object W is formed on the layers EL of the vertical portion E2 of the support body E, banding generated in the support body E gives no influence on the three-dimensional object W.

In view of this, the nozzle extrusion control is performed for each of the extruders 41Y, 41M, 41C, 41K, 41W, and 41CL, and the support ink extruder 44, that is, for each of the nozzle arrays 303 as a unit.

In the nozzle extrusion control, the inks are extruded a plurality of times from the plurality of the nozzles 302, which are arrayed in the sub-scanning direction, of the extruders 41Y, 41M, 41C, 41K, 41W, and 41CL, and the support ink extruder 44 in such a manner that each of the layers L is formed of the plurality of print paths 50 at each position in each of the layers L, EL. Also, the print paths 50 are set in such a manner that boundaries 52 between the print paths 50 extend diagonally with respect to the main scanning direction (see FIG. 10).

Specifically, in the nozzle extrusion control, a setting is made as to path positions 404a to e (illustrated in FIG. 11(b)), which are positions of the plurality of print paths 50 (illustrated in FIG. 10). The width of each of the path positions 404a to e in the sub-scanning direction is equal to the band width.

In this embodiment, as illustrated in FIG. 10, the print paths 50 have a wavy shape vibrating back and forth in the sub-scanning direction. Consequently, the path positions 404a to e having a wavy shape are set in accordance with the print paths 50.

In FIG. 11(b), however, to simplify the illustration, the path positions 404a to e each have a rectangular shape. FIG. 10 is a plan view of an example of the print paths in the nozzle extrusion control of the method for forming the three-dimensional object according to the embodiment. FIG. 11 is a diagram illustrating the nozzle extrusion control of the method for forming the three-dimensional object according to the embodiment. FIG. 11(a) is a diagram illustrating an exemplary configuration of the extruder. FIG. 11(b) is a diagram illustrating an exemplary method for extruding the inks to each position on the work surface a plurality of times.

In this embodiment, the extruders 41Y, 41M, 41C, 41K, 41W, and 41CL, and the support ink extruder 44 print each position in each of the layers L, EL with four print paths 50. Accordingly, each of the extruders 41Y, 41M, 41C, 41K, 41W, and 41CL, and the support ink extruder 44 is divided into at least 4 ink extrusion regions 402a to d in the sub-scanning direction. The width of each of the ink extrusion regions 402a to d in the sub-scanning direction is equal to the band width. Thus, each time the extruders 41Y, 41M, 41C. 41K, 41W, and 41CL, and the support ink extruder 44 scan in the main scanning direction, each of the ink extrusion regions 402a to d extrudes the inks and the support ink having an amount necessary for one print path 50.

It should be noted that in this embodiment, boundaries between the ink extrusion regions 402a to d are changed in accordance with positions of the extruders 41Y, 41M, 41C, 41K, 41W, and 41CL, and the support ink extruder 44 in the main scanning direction. Thus, the extruders 41Y, 41M, 41C, 41K, 41W, and 41CL, and the support ink extruder 44 extrude the inks and the support ink in accordance with the print paths 50 of the wavy shape.

The nozzle extrusion control will now be described in greater detail while showing a positional relationship of the extruders 41Y, 41M, 41C, 41K, 41W, and 41CL, and the support ink extruder 44 with the work surface 2a.

When the inks and the support ink are extruded onto the path positions 404a to e, and when the path position 404a and a position of the ink extrusion region 402a in the sub-scanning direction first overlap each other, a setting is made as to, for example, a print region including a print path 50 corresponding to the path position 404a and the three other print paths 50.

Then, the extruders 41Y, 41M, 41C, 41K, 41W, and 41CL, and the support ink extruder 44 move in the main scanning direction (FIG. 1(b)). As a result of this movement, the inks and the support ink are extruded onto the path position 404a from the extrusion regions 402a of the extruders 41Y, 41M, 41C, 41K, 41W, and 41CL, and the support ink extruder 44.

Subsequently, the sub-scanning direction mover 62 moves the work surface 2a in the sub-scanning direction by a distance corresponding to the band width. As a result, positions of the path positions 404a and 404b in the sub-scanning direction respectively overlap the ink extrusion regions 402b and 402a. At this point of time, a setting is made as to, for example, a print region including the print paths 50 corresponding to the path positions 404a and 404b and the two other print paths 50.

Then, the extruders 41Y, 41M, 41C, 41K, 41W, and 41CL, and the support ink extruder 44 move in the main scanning direction (FIG. 11(b)). As a result of this movement, the inks are respectively extruded onto the path positions 404b and 404a from the extrusion regions 402a and 402b of the extruders 41Y, 41M, 41C, 41K, 41W, and 41CL, and the support ink extruder 44.

Subsequently, the sub-scanning direction mover 62 further moves the work surface 2a by a distance corresponding to the band width. As a result, positions of the path positions 404a to 404c in the sub-scanning direction respectively overlap the ink extrusion regions 402c to 402a.

At this point of time, a setting is made as to, for example, a print region including the print paths 50 corresponding to the path positions 404a to 404c and the one other print path 50. Then, the extruders 41Y, 41M, 41C, 41K, 41W, and 41CL, and the support ink extruder 44 move in the main scanning direction (FIG. 11(b)). As a result of this movement, the inks are respectively extruded onto the path positions 404c to 404a from the ink extrusion regions 402a to 402c of the extruders 41Y, 41M, 41C, 41K, 41W, and 41CL, and the support ink extruder 44.

Subsequently, the sub-scanning direction mover 62 further moves the work surface 2a by a distance corresponding to the band width. As a result, positions of the path positions 404a to 404d in the sub-scanning direction respectively overlap the ink extrusion regions 402d to 402a. At this point of time, a setting is made as to, for example, a print region including the print paths 50 corresponding to the path positions 404a to 404d.

Then, the extruders 41Y, 41M, 41C, 41K, 41W, and 41CL, and the support ink extruder 44 move in the main scanning direction (FIG. 11(b)). As a result of this movement, the inks are respectively extruded onto the path positions 404d to 404a from the ink extrusion regions 402a to 402d of the extruders 41Y, 41M, 41C, 41K, 41W, and 41CL, and the support ink extruder 44.

At this point of time, extrusion of the inks for all the four print paths 50 onto the path position 404a is completed. Thereafter, the same operation as described above is repeated to successively extrude the inks required for the rest of the print paths 50 onto the other path positions 404b to 404e.

FIG. 12 is a diagram illustrating an exemplary correspondence of the nozzles 302 of the extruders 41Y, 41M, 41C, 41K, 41W, and 41CL, and the support ink extruder 44 to the print paths 50.

FIG. 12(a) illustrates an arrangement of the nozzles 302 divided into the ink extrusion regions 402a to 402d.

In this embodiment, the nozzles 302 arrayed in the sub-scanning direction are divided into a dummy nozzle region 406a, the ink extrusion regions 402a to 402d, and a dummy nozzle region 406b. The ink extrusion regions 402a to 402d each have the same number of nozzles 302. The nozzles 302 of each of the ink extrusion regions 402a to 402d respectively correspond to the four print paths 50 to be formed simultaneously. Thus, the nozzles 302 in each range of the ink extrusion regions 402a to 402d are selected as the nozzles 302 to inject ink droplets onto each of the four print paths 50 of the print region.

The nozzles 302 in the dummy nozzle region 406a and 406b are set as dummy nozzles to extrude no inks.

In accordance with the positions, in the main scanning direction, of the extruders 41Y, 41M, 41C, 41K, 41W, and 41CL, and the support ink extruder 44 that move in the main scanning direction, boundaries among the dummy nozzle region 406a, the ink extrusion regions 402a to 402d, and the dummy nozzle region 406b are changed to change which of the nozzles 302 correspond to the respective print paths 50. For example, each time the extruders 41Y, 41M, 41C, 41K, 41W, and 41CL, and the support ink extruder 44 move for a predetermined distance, the positions of the ink extrusion regions 402a to 402d are deviated in sequence in the sub-scanning direction. Thus, ranges of the nozzles 302 selected in accordance with the respective print paths 50 are changed in sequence in accordance with the positions of the extruders 41Y, 41M, 41C, 41K, 41W, and 41CL, and the support ink extruder 44 in the main scanning direction.

It should be noted that in accordance with a change in the positions of the ink extrusion regions 402a to 402d, ranges of the dummy nozzle regions 406a and 406b are changed. This ensures that the positions of the ink extrusion regions 402a to 402d are deviated while keeping the ink extrusion regions 402a to 402d in the same size.

In FIG. 12, the number of the nozzles 302 is simplified in the illustration. The ink extrusion regions 402a to 402d and the dummy nozzle regions 406a and 406b each include more nozzles 302 than illustrated ones, for example.

FIG. 12(b) illustrates an exemplary change of the boundary 52 between the print paths 50 in accordance with a change in the positions of the ink extrusion regions 402a to 402d.

When the positions of the ink extrusion regions 402a to 402d are deviated in the sub-scanning direction, the boundary 52 between the print paths 50 is accordingly deviated in a stepped manner in the sub-scanning direction. Consequently, this embodiment ensures that while the extruders 41Y, 41M, 41C, 41K, 41W, and 41CL, and the support ink extruder 44 are being moved in the main scanning direction, positions of the boundaries 52 between the print paths 50 are changed in accordance with the positions of the extruders 41Y, 41M, 41C, 41K, 41W, and 41CL, and the support ink extruder 44.

The positions of the ink extrusion regions 402a to 402d are displaced in sequence in the sub-scanning direction, and accordingly, the boundaries 52 between the print paths 50 are displaced in sequence in a stepped manner. Consequently, the boundaries 52 extend in zigzag lines diagonally with respect to the main scanning direction. In view of this, the print paths 50 are set to make the boundaries 52 between the print paths 50 extend diagonally with respect to the main scanning direction.

Each time the boundaries 52 are displaced in a stepped manner a predetermined number of times, for example, the direction in which the positions of the ink extrusion regions 402a to 402d are displaced is reversed. This ensures that the boundaries 52 between the print paths 50 have the wavy shape vibrating back and forth in the sub-scanning direction. According to this embodiment, therefore, the print paths 50 having the wavy shape described by referring to FIG. 10, for example, are appropriately set.

In this embodiment, between the layers L, EL disposed on top of each other in the deposition direction, directions in which the boundaries 52 between the print paths 50 are displaced are reverse to each other. For example, in an odd-number-th layer L, EL from the bottom, the print paths 50 are set in such a manner that the boundary 52 between the print paths 50 extends in a zigzag line in a diagonal direction with respect to the main scanning direction, as indicated with a thin solid line in FIG. 10. In an even-number-th layer L, EL from the bottom, the print paths 50 are set in such a manner that the boundary 52 between the print paths 50 extends in a diagonal direction, which is reverse to the diagonal direction in the case of the odd-number-th layer L, EL, with respect to the main scanning direction, as indicated with a thick solid line in FIG. 10. In this manner, in the nozzle extrusion control, the print paths 50 are formed in such a manner that between the layers L, EL adjacent to each other in the deposition direction, the boundary 52 between the print paths 50 is at least partly deviated in the sub-scanning direction.

In forming the model portion WM, the color portion WC, and the clear portion WCL of each of the layers L and each of the layers EL of the support body E, as to which the controller 7 has determined not to perform the nozzle extrusion control, the controller 7 sets the print paths 50 in such a manner that the boundaries 52 between the print paths 50 extend parallel to the main scanning direction.

At the processing determination step (step ST25), the controller 7 causes the output module 72 to generate extrusion patterns of the extruders 41Y, 41M, 41C, 41K, 41W, and 41CL for each of the layers L of the three-dimensional object W based on whether to perform the nozzle extrusion control and based on the cross-sectional slice information. Then, the output module 72 generates extrusion control amounts, cure control amounts, and control amounts of the carriage driver 5 and the platform driver 6, for example, so as to realize the generated extrusion patterns.

At the processing determination step (step ST25), the controller 7 generates extrusion patterns of the support ink extruder 44 for each of the layers EL of the support body E based on whether to perform the nozzle extrusion control and based on the cross-sectional slice information of the support body E. Then, the controller 7 generates extrusion control amounts, cure control amounts, and control amounts of the carriage driver 5 and the platform driver 6, for example, so as to realize the generated extrusion patterns.

When determining to perform the nozzle extrusion control, the controller 7 generates extrusion patterns of the extruders 41Y, 41M, 41C, 41K, 41W, and 41CL, and the support ink extruder 44 to perform the nozzle extrusion control. Then, the controller 7 generates extrusion control amounts, cure control amounts, and control amounts of the carriage driver 5 and the platform driver 6, for example, so as to realize the generated extrusion patterns.

When determining not to perform the nozzle extrusion control, the controller 7 generates extrusion patterns of the extruders 41Y, 41M, 41C, 41K, 41W, and 41CL, and the support ink extruder 44 that are not to perform the nozzle extrusion control. Then, the controller 7 generates extrusion control amounts, cure control amounts, and control amounts of the carriage driver 5 and the platform driver 6, for example, so as to realize the generated extrusion patterns.

Next, the controller 7 causes the output module 72 to transmit the extrusion control amounts, the cure control amounts, and the control amounts of the carriage driver 5 and the platform driver 6, for example, to realize the extrusion patterns of the extruders 41Y. 41M, 41C, 41K, 41W, and 41CL, and the support ink extruder 44 to the carriage driver 5, the platform driver 6, the extruders 41Y, 41M, 41C, 41K, 41W, and 41CL, the support ink extruder 44, and the ultraviolet irradiator 42 (step ST26).

Next, the controller 7 performs the unit-layer formation step (step ST27) to cause the ink-jet printer 1 to form each of the layers L, EL based on the cross-sectional slice information of the three-dimensional object W and the cross-sectional slice information of the support body E.

At the unit-layer formation step (step ST27), the controller 7 causes the extruders 41Y, 41M, 41C, 41K, 41W, and 41CL, the support ink extruder 44, and the ultraviolet irradiator 42 to move in the main scanning direction relative to the work surface 2a of the platform 2 in accordance with the generated extrusion patterns. Also, the controller 7 causes the platform 2 to rotate about the axis in the sub-scanning direction relative to the extruders 41Y, 41M, 41C, 41K, 41W, and 41CL, the support ink extruder 44, and the ultraviolet irradiator 42. In the meantime, the controller 7 causes the extruders 41Y, 41M, 41C, 41K, 41W, and 41CL, and the support ink extruder 44 to extrude the inks and the support ink onto the work surface 2a, and exposes the extruded inks to ultraviolet light emitted from the ultraviolet irradiator 42. Thus, each of the layers L, EL is formed.

Specifically, the unit-layer formation step (step ST27) includes a printing step (step ST27A) and a sub-scanning direction movement step (step ST27B).

At the printing step (step ST27A), the controller 7 controls the carriage driver 5, the vertical direction mover 61, and the axis rotator 63 so as to locate the carriage 4 at an appropriate position with respect to the work surface 2a. Then, the controller 7 causes the carriage driver 5 to move the carriage 4 in the main scanning direction to move the extruders 41Y, 41M, 41C, 41K, 41W, and 41CL, the support ink extruder 44, and the ultraviolet irradiator 42, which are attached to the carriage 4, in the main scanning direction.

While moving the extruders 41Y, 41M, 41C, 41K, 41W, and 41CL, the support ink extruder 44, and the ultraviolet irradiator 42 in the main scanning direction, the controller 7 causes the extruders 41Y, 41M, 41C, 41K, 41W, and 41CL, and the support ink extruder 44 to extrude the inks and the support ink onto the work surface 2a or formed layers L, EL (equivalent to the deposited surface) and causes the ultraviolet irradiator 42 to irradiate the inks and the support ink with ultraviolet light at an appropriate timing to form each of the layers L, EL that has been generated at the extrusion pattern generation step.

The extruded inks and support ink land and cure on the work surface 2a or the formed layers L, EL.

Then, while moving the carriage 4 in the main scanning direction one time or more, the controller 7 causes the extruders 41Y, 41M, 41C, 41K, 41W, and 41CL, and the support ink extruder 44 to extrude the inks and the support ink, and exposes the extruded inks and support ink to the ultraviolet light emitted from the ultraviolet irradiator 42 to cure the extruded inks and support ink. Thus, a single print path 50 of each of the layers L, EL in the main scanning direction is formed.

Then, at the sub-scanning direction movement step (step ST27B), the controller 7 controls the sub-scanning direction mover 62 to move the platform 2 in the sub-scanning direction by a distance corresponding to the single print path 50. Consequently, the extruders 41Y, 41M, 41C, 41K, 41W, and 41CL, the support ink extruder 44, and the ultraviolet irradiator 42 as one group, and the work surface 2a are moved relative to each other in the sub-scanning direction.

Thereafter, the controller 7 makes a determination as to whether formation of the whole layer L, EL is ended (step ST27C). When the controller 7 determines that formation of the whole layer L, EL has not been ended (step ST27C: No), the controller 7 returns to the printing step (step ST27A).

At the unit-layer formation step (step ST27), the controller 7 alternately performs the printing step (step ST27A) and the sub-scanning direction movement step (step ST27B) so as to form a plurality of print paths 50 to form each of the layers L, EL. When determining that formation of the layer L, EL is ended (step ST27C: Yes), the controller 7 ends formation of the whole layer L, EL.

At the unit-layer formation step (step ST27), the nozzle extrusion control is performed when the layer L, EL is formed based on the cross-sectional slice information of the three-dimensional object W and the cross-sectional slice information of the support body E as to which a determination has been made to perform the nozzle extrusion control at the processing determination step (step ST25).

At this unit-layer formation step (step ST27), when the nozzle extrusion control is performed, the print paths 50 are formed in such a manner that between the layers L, EL adjacent to each other in the deposition direction of the layers L, EL, the boundary 52 between the print paths 50 is at least partly deviated in the sub-scanning direction.

At the unit-layer formation step (step ST27), the nozzle extrusion control is not performed when the layer L, EL is formed based on the cross-sectional slice information of the three-dimensional object W and the cross-sectional slice information of the support body E as to which a determination has been made not to perform the nozzle extrusion control at the processing determination step (step ST25). Then, the print paths 50 are formed in such a manner that the boundary 52 between the print paths 50 is parallel to the main scanning direction.

Next, the controller 7 sets that n=n+1 (step ST28), and makes a determination as to whether n exceeds N (step ST29).

When determining that n has not exceeded N (step ST29: No), the controller 7 returns to the slice information calculation step (step ST23) to calculate cross-sectional slice information of the three-dimensional object W and cross-sectional slice information of the support body E of a next layer L, EL. Thereafter, the controller 7 controls the vertical direction mover 61 to lower the work surface 2a by such a distance corresponding to one layer L, EL that the work surface 2a is at an appropriate position in the vertical direction to form the next layer L, EL.

Then, the controller 7 analyzes the cross-sectional slice information of the three-dimensional object W and the cross-sectional slice information of the support body E (step ST24), makes a determination as to whether to perform the nozzle extrusion control (step ST25), generates extrusion patterns, for example, and transmits the extrusion patterns and other information to the extruders 41Y, 41M, 41C, 41K, 41W, and 41CL, the support ink extruder 44, and the ultraviolet irradiator 42 (step ST26).

In accordance with the generated extrusion patterns, while the controller 7 causes the extruders 41Y, 41M, 41C, 41K, 41W, and 41CL, the support ink extruder 44, and the ultraviolet irradiator 42 to relatively move in the main scanning direction, and while the controller 7 causes the platform 2 to relatively rotate about the axis in the sub-scanning direction, the controller 7 causes the extruders 41Y, 41M, 41C, 41K, 41W, and 41CL, and the support ink extruder 44 to extrude the inks and the support ink onto the work surface 2a and exposes the extruded inks and support ink to ultraviolet light emitted from the ultraviolet irradiator 42 so as to form each of the layers L, EL (step ST27).

The controller 7 repeats the above-described step, namely, the unit-layer formation step (step ST27) for each of the layers L, EL so as to form the three-dimensional object W and the support body E in sequence from lower layers L, EL, as illustrated in FIG. 5. When the controller 7 determines that n has exceeded N (step ST29: Yes), formation of the three-dimensional object W is completed. By, for example, removing the three-dimensional object W with the support body E from the work surface 2a, the controller 7 ends the method for forming the three-dimensional object in the embodiment.

The three-dimensional object W after formation completion has the shape specified by the shape data of the three-dimensional data and has a surface on which an image specified by the surface image data is formed.

By the ink-jet printer 1 and the method for forming the three-dimensional object according to the embodiment described above, the print paths 50 are formed in such a manner that between the deposited layers L, EL on top of each other, the print paths 50 are at least partly displaced from each other in the sub-scanning direction so as to form each of the layers L, EL. Consequently, by the ink-jet printer 1 and the method for forming the three-dimensional object, it is ensured that in deposition of the layers L, EL, the boundaries 52 between the print paths 50 are prevented from being continuous in the deposition direction, and streaks parallel to the main scanning direction are prevented from being generated on the produced three-dimensional object W.

By the ink-jet printer 1 and the method for forming the three-dimensional object, since the print paths 50 are set in such a manner that the boundaries 52 between the print paths 50 extend diagonally with respect to the main scanning direction, the boundaries 52 between the print paths 50 are diagonal with respect to the main scanning direction. This makes streaks inconspicuous even if the streaks are generated along the boundaries 52 between the print paths 50.

By the ink-jet printer 1 and the method for forming the three-dimensional object, between the layers L, EL deposited on top of each other (between the layers L, EL adjacent to each other in the deposition direction), the directions in which the boundaries 52 between the print paths 50 extend are different from each other. In this embodiment, between the layers L, EL deposited on top of each other, the directions in which the print paths 50 are displaced from each other in the sub-scanning direction are reverse to each other. By the ink-jet printer 1 and the method for forming the three-dimensional object, therefore, it is ensured that streaks parallel to the main scanning direction are prevented from being generated on the produced three-dimensional object W. In addition, it is ensured that the produced three-dimensional object W and, in particular, its upper surface, for example, is made flat.

The ink-jet printer 1 and the method for forming the three-dimensional object further include the processing determination step (step ST25) of making a determination as to whether to perform the nozzle extrusion control for each piece of the cross-sectional slice information and each piece of the cross-sectional slice information on the support body side based on the cross-sectional slice information and the cross-sectional slice information on the support body side. Consequently, the present invention causes the nozzle extrusion control to be performed or not to be performed in accordance with, for example, a shape and color depths of a surface image of each of the layers L, EL. This enables the ink-jet printer 1 and the method for forming the three-dimensional object to form the three-dimensional object W with higher accuracy.

By the ink-jet printer 1 and the method for forming the three-dimensional object, the print paths 50 in the portion as to which a determination has been made not to perform the nozzle extrusion control are set in such a manner that the print paths 50 are parallel to the main scanning direction.

By the ink-jet printer 1 and the method for forming the three-dimensional object, therefore, when the inks and the support ink are extruded along each print path 50, the inks and the support ink are simultaneously extruded from nozzles as many as possible among the plurality of nozzles 302 of the extruders 41Y, 41M, 41C, 41K, 41W, and 41CL, and the support ink extruder 44. This enables the ink-jet printer 1 and the method for forming the three-dimensional object to improve ink-landing accuracy with respect to details of the three-dimensional object W so as to perform precise formation.

By the ink-jet printer 1 and the method for forming the three-dimensional object, since the nozzle extrusion control is performed for each of the nozzle arrays 303 as a unit, a setting as to whether to perform the nozzle extrusion control is made for each kind of the extruded inks and support ink. Accordingly, by the ink-jet printer 1 and the method for forming the three-dimensional object, a setting as to whether to perform the nozzle extrusion control is made for each of the model portion WM, the color portion WC, and the clear portion WCL in each of the layers L of the three-dimensional object W, and each of the layers EL of the support body E. Therefore, the ink-jet printer 1 and the method for forming the three-dimensional object ensure that the nozzle extrusion control is appropriately performed to form the three-dimensional object W with higher accuracy.

By the ink-jet printer 1 and the method for forming the three-dimensional object, a determination as to whether to perform the nozzle extrusion control is made based on the surface image data of the cross-sectional slice information. Consequently, a determination as to whether to perform the nozzle extrusion control is appropriately made in accordance with, for example, the surface color depths of the three-dimensional object W. For example, when the surface color of the three-dimensional object W is deep, the nozzle extrusion control is performed, and when the surface color of the three-dimensional object W is light, the nozzle extrusion control is not performed. As a result, it is ensured that the ink-jet printer 1 and the method for forming the three-dimensional object improve ink-landing accuracy in portions of the three-dimensional object W where the surface color is light, and suppress generation of streaks parallel to the main scanning direction in portions of the three-dimensional object W where the surface color is deep.

By the ink-jet printer 1 and the method for forming the three-dimensional object, a determination as to whether to perform the nozzle extrusion control is made based on the cross-sectional slice information of the support body E. Consequently, it is ensured that a determination as to whether to perform the nozzle extrusion control for each of the layers EL is appropriately made in accordance with, for example, an angle, with respect to the X-Y plane, of the portions of the plurality of layers EL of the support body E that serve to form the outer surfaces of the three-dimensional object W.

[Modification 1]

Figure 13:
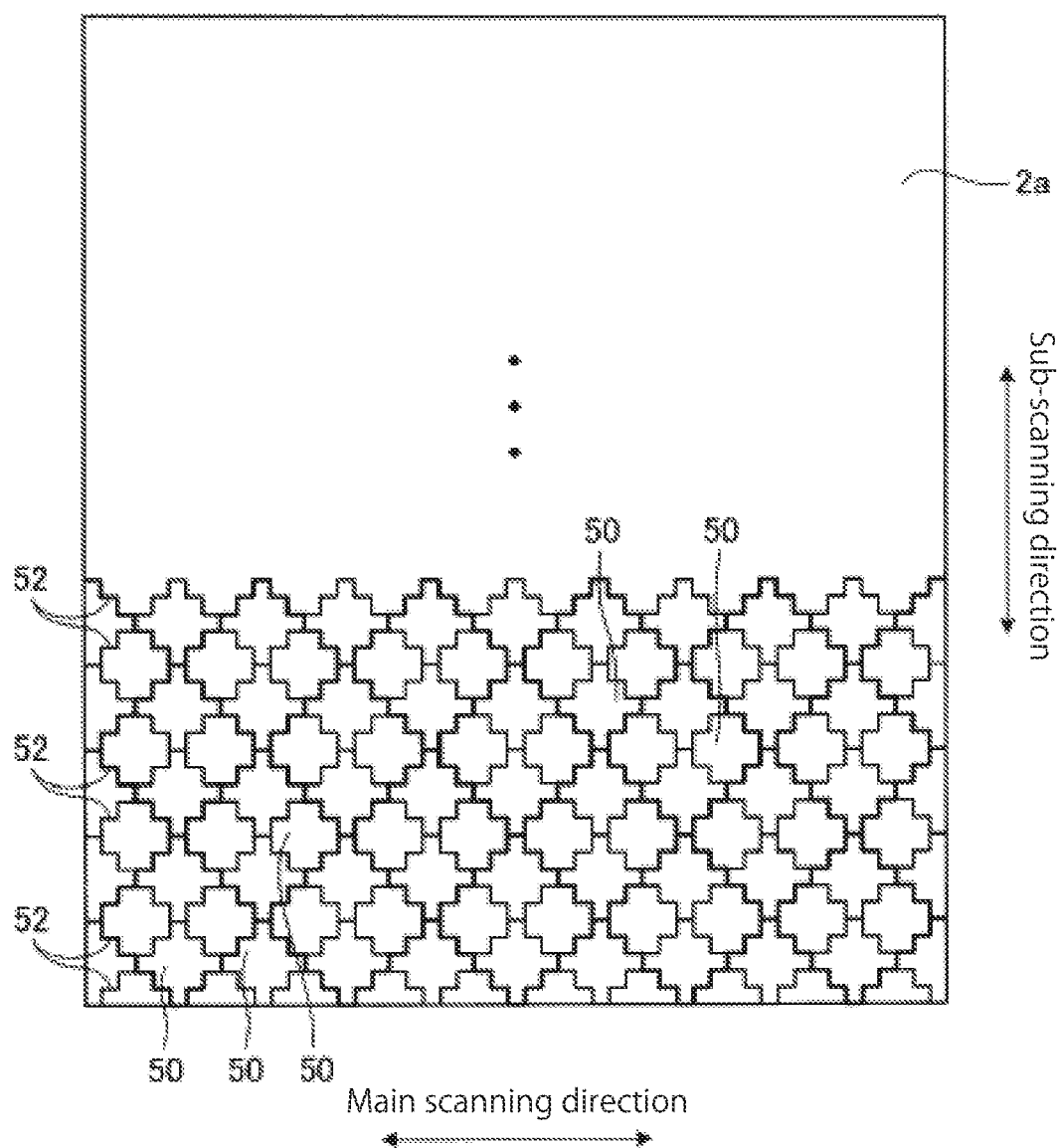
FIG. 13 is a plan view of exemplary print paths in nozzle extrusion control in a method for forming a three-dimensional object according to modification 1 of the embodiment.

FIG. 13 is a plan view of exemplary print paths in nozzle extrusion control in a method for forming a three-dimensional object according to modification 1 of the embodiment. In FIG. 13, identical components in the above-described embodiment will be denoted with the same reference numerals and will not be elaborated here.

In a similar manner to the above-described embodiment, at the unit-layer formation step (step ST27), the controller 7 of the ink-jet printer 1 as a three-dimensional printer according to modification 1 of the embodiment causes the plurality of nozzles 302 of the extruders 41Y, 41M, 41C, 41K, 41W, and 41CL, and the support ink extruder 44, which nozzles are arrayed in the sub-scanning direction, to extrude inks a plurality of times at each position in each of the layers L, EL. Thus, each of the layers L, EL is formed of the plurality of print paths 50.

As illustrated in FIG. 13, in the nozzle extrusion control in modification 1, in order to make the width of the print paths 50 in the sub-scanning direction change in the main scanning direction, control is performed to change extrusion duties from the plurality of nozzles 302 while the extruders 41Y, 41M, 41C, 41K, 41W, and 41CL, and the support ink extruder 44 are being moved in the main scanning direction.

In this description, the extrusion duty represents the number of the nozzles 302 in each nozzle array 303 that extrude the inks simultaneously. Specifically, in the nozzle extrusion control of the ink-jet printer 1 according to modification 1, while the extruders 41Y, 41M, 41C, 41K, 41W, and 41CL, and the support ink extruder 44 are being moved in the main scanning direction, the number of the nozzles 302 of the extruders 41Y, 41M, 41C, 41K, 41W, and 41CL, and the support ink extruder 44, which nozzles extrude the inks and the support ink, is changed to make the width of the print paths 50 in the sub-scanning direction change in the main scanning direction.

In the nozzle extrusion control in modification 1, while the extruders 41Y, 41M, 41C, 41K, 41W, and 41CL, and the support ink extruder 44 are being moved in the main scanning direction, the inks and the support ink are extruded from the nozzles 302 of the extruders 41Y, 41M, 41C, 41K, 41W, and 41CL, and the support ink extruder 44, which nozzles are located in the center of the extruders in the sub-scanning direction. As the positions of the extruders 41Y, 41M, 41C, 41K, 41W, and 41CL, and the support ink extruder 44 in the main scanning direction change, the inks and the support ink are extruded from the nozzles 302 on end sides in the sub-scanning direction, and thereafter, extrusion of the inks and the support ink from the nozzles 302 on the end sides is stopped. Such extrusion and stoppage are repeated. Thus, the boundaries 52 between the print paths 50 have a wavy shape vibrating back and forth in the sub-scanning direction.

In the nozzle extrusion control in modification 1, between the layers L, EL disposed on top of each other, the cycle of the boundary 52 between the print paths 50 is deviated approximately by a half. For example, in an odd-number-th layer L, EL from the bottom, the print paths 50 are set in such a manner that the boundary 52 between the print paths 50 extends as indicated with a thin solid line in FIG. 13. In an even-number-th layer L, EL from the bottom, the print paths 50 are set in such a manner that the boundary 52 between the print paths 50 extends as indicated with a thick solid line in FIG. 13. In this manner, in the nozzle extrusion control, the print paths 50 are formed in such a manner that between the layers L, EL adjacent to each other in the deposition direction, the boundary 52 between the print paths 50 is at least partly deviated in the sub-scanning direction.

In modification 1, when the nozzle extrusion control is not performed, the inks and the support ink are extruded from nozzles 302 as many as possible among the plurality of nozzles 302 (preferably, all of the nozzles 302) of the extruders 41Y, 41M, 41C, 41K, 41W, and 41CL, and the support ink extruder 44 so as to form each of the layers L, EL.

In a similar manner to the embodiment, the ink-jet printer 1 and the method for forming the three-dimensional object in modification 1 ensure that streaks parallel to the main scanning direction are prevented from being generated on the produced three-dimensional object W.

By the ink-jet printer 1 and the method for forming the three-dimensional object in modification 1, since the print paths 50 are set in such a manner that the width of the print paths 50 in the sub-scanning direction changes in the main scanning direction, the boundaries 52 between the print paths 50 are diagonal with respect to the main scanning direction. This makes streaks inconspicuous even if the streaks are generated along the boundaries 52 between the print paths 50.

By the ink-jet printer 1 and the method for forming the three-dimensional object in modification 1, between the layers L, EL deposited on top of each other, the cycles of the extrusion duties of the extruders 41Y, 41M, 41C, 41K, 41W, and 41CL, and the support ink extruder 44 are deviated. By the ink-jet printer 1 and the method for forming the three-dimensional object in modification 1, therefore, it is ensured that streaks parallel to the main scanning direction are prevented from being generated on the produced three-dimensional object W. In addition, it is ensured that the produced three-dimensional object W and, in particular, its upper surface, for example, is made flat.

[Modification 2]

Figure 14:
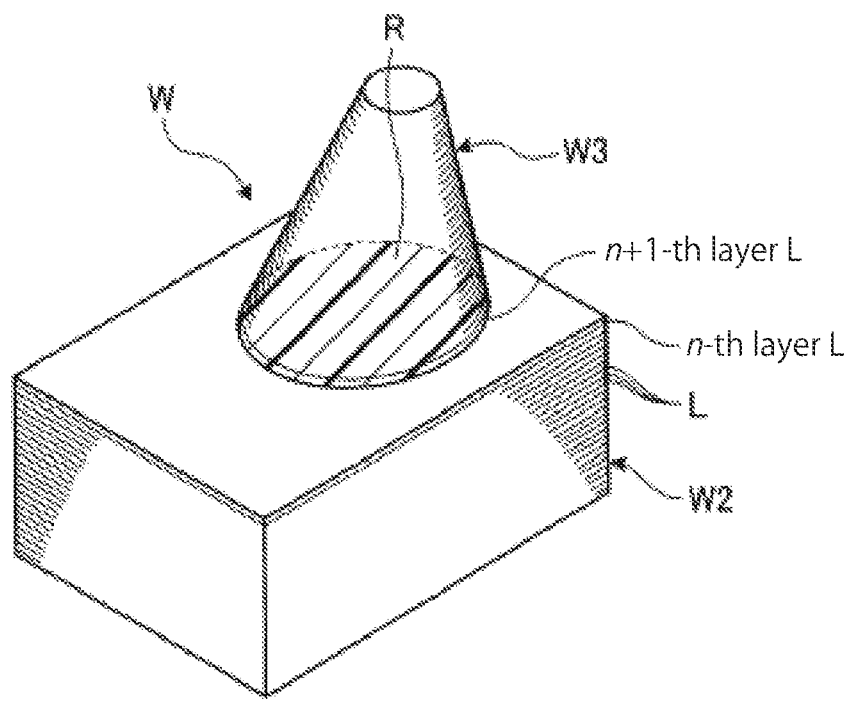
FIG. 14 is a diagram illustrating nozzle extrusion control in a method for forming a three-dimensional object according to modification 2 of the embodiment.

FIG. 14 is a diagram illustrating nozzle extrusion control in a method for forming a three-dimensional object according to modification 2 of the embodiment. In FIG. 14, identical components in the above-described embodiment will be denoted with the same reference numerals and will not be elaborated here.

The controller 7 of the ink-jet printer 1 according to modification 2 of the embodiment calculates cross-sectional slice information of an n-th layer L and cross-sectional slice information of a layer L on the n-th layer L, namely, an n+1-th layer L at the slice information calculation step (step ST23). Then, at the processing determination step (step ST25), when determining whether to perform the nozzle extrusion control for each piece of the cross-sectional slice information, the controller 7 compares a shape indicated by the cross-sectional slice information of the n-th layer L as to which a determination is made as to whether to perform the nozzle extrusion control, with a shape indicated by the cross-sectional slice information of the n+1-th layer L to be formed right after the n-th layer L, as illustrated in FIG. 14. Then, the controller 7 makes a determination to perform the nozzle extrusion control as to a region R (indicated by parallel slant lines in FIG. 14) of the cross-sectional slice information of the n-th layer L as to which a determination is made as to whether to perform the nozzle extrusion control, in which region the cross-sectional slice information of the n-th layer L overlaps the cross-sectional slice information of the n+1-th layer L to be formed after the formation of the n-th layer L.

In a similar manner to the embodiment, the ink-jet printer 1 and the method for forming the three-dimensional object in modification 2 ensure that streaks parallel to the main scanning direction are prevented from being generated on the produced three-dimensional object W.

By the ink-jet printer 1 and the method for forming the three-dimensional object in modification 2, when forming the region R of the cross-sectional slice information of the n-th layer L in which the cross-sectional slice information of the n-th layer L overlaps the cross-sectional slice information of the n+1-th layer L to be formed after the formation of the n-th layer L, the nozzle extrusion control is performed. Consequently, by the ink-jet printer 1 and the method for forming the three-dimensional object in modification 2, it is ensured that in the portion where the layers L of the three-dimensional object W are deposited on top of each other, for example, deposition of the boundaries 52 between the print paths 50 is prevented to improve formation accuracy of the upper layer L.

[Modification 3]

Figure 15:
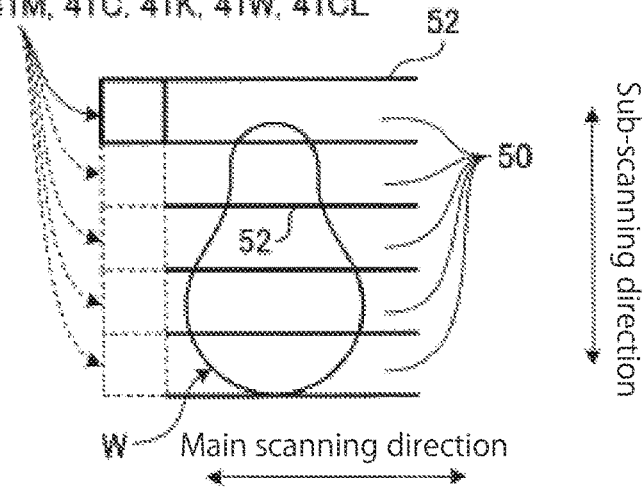
FIG. 15 is a diagram illustrating a unit-layer formation step in a method for forming a three-dimensional object according to modification 3 of the embodiment.
Figure 15:
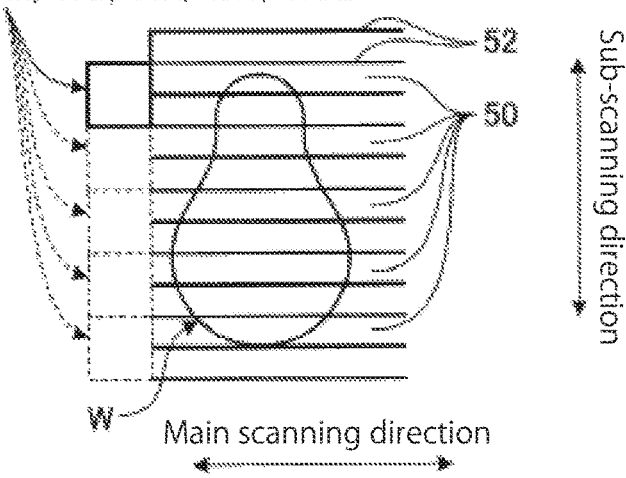
Figure 15:
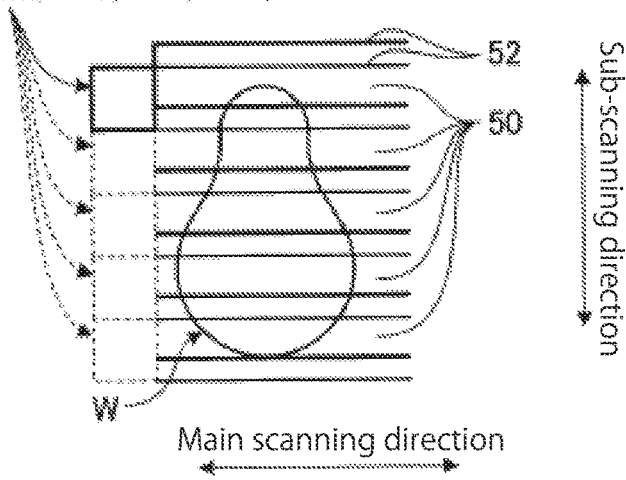

FIG. 15 is a diagram illustrating a unit-layer formation step in a method for forming a three-dimensional object according to modification 3 of the embodiment. In FIG. 15, identical components in the above-described embodiment will be denoted with the same reference numerals and will not be elaborated here. FIG. 15(a) is a plan view of a state of forming an n-th layer L at the unit-layer formation step in the method for forming the three-dimensional object according to modification 3 of the embodiment. FIG. 15(b) is a plan view of a state of forming an n+1-th layer L at the unit-layer formation step in the method for forming the three-dimensional object according to modification 3 of the embodiment. FIG. 15(c) is a plan view of another exemplary state of forming an n+1-th layer L at the unit-layer formation step in the method for forming the three-dimensional object according to modification 3 of the embodiment.

The method for forming the three-dimensional object according to modification 3 of the embodiment employs what is called single-pass recording in which each position in each of the layers L, EL is formed of a single print path 50 (namely, by one step of ink extrusion).

In the method for forming the three-dimensional object according to modification 3 of the embodiment, a setting is made as to the print paths 50 that have a band width to enable printing when the inks and the support ink are extruded from all of the nozzles 302 of the extruders 41Y, 41M, 41C, 41K, 41W, and 41CL, and the support ink extruder 44, and that are parallel to the main scanning direction. At the printing step (step ST27A) of the unit-layer formation step (step ST27), while the extruders 41Y, 41M, 41C, 41K, 41W, and 41CL, and the support ink extruder 44 are being moved in the main scanning direction, the inks and the support ink are extruded from nozzles 302 as many as possible so as to form each of the print paths 50.

For example, as illustrated in FIG. 15(a), in forming the print paths 50 in a central part of the n-th layer L in the sub-scanning direction, the inks and the support ink are extruded from all of the plurality of nozzles 302 of the extruders 41Y, 41M, 41C, 41K, 41W, and 41CL, and the support ink extruder 44, which nozzles are arrayed in the sub-scanning direction.

In this manner, in modification 3, at the unit-layer formation step, in forming at least some of the print paths 50, while the extruders 41Y, 41M, 41C, 41K, 41W, and 41CL, and the support ink extruder 44 are being moved in the main scanning direction, the inks and the support ink are extruded from all of the plurality of nozzles 302 arrayed in the sub-scanning direction.

At the sub-scanning direction movement step (step ST27B) of the unit-layer formation step (step ST27) at which the nozzle extrusion control is performed, the work surface 2a is moved in the sub-scanning direction by a distance corresponding to the band width of the print paths 50.

In the method for forming the three-dimensional object according to modification 3 of the embodiment, in forming the print paths 50 of the n+1-th layer L, EL on the n-th layer L, EL, as illustrated in FIG. 15(b) and FIG. 15(c), the print paths 50 are formed in such a manner that the entire boundaries 52 between the print paths 50 are deviated in the sub-scanning direction between the layers L, EL adjacent to each other in the deposition direction of the layers L, EL. That is, the print paths 50 are formed in such a manner that the boundaries 52 between the print paths 50 are all different between the layers L, EL adjacent to each other in the deposition direction of the layers L.

In FIG. 15(b), between the layers L, EL adjacent to each other in the deposition direction of the layers L, EL, the boundaries 52 between the print paths 50 are deviated in the sub-scanning direction by a distance corresponding to a half of the band width of the print paths 50. In FIG. 15(c), between the layers L, EL adjacent to each other in the deposition direction of the layers L, EL, the boundaries 52 between the print paths 50 are deviated in the sub-scanning direction by a distance corresponding to approximately a third of the band width of the print paths 50. It should be noted that thick solid lines in FIG. 15(b) and FIG. 15(c) indicate the boundaries 52 between the print paths 50 in the n-th layer L, EL, and that thin solid lines in FIG. 15(b) and FIG. 15(c) indicate the boundaries 52 between the print paths 50 in the n+1-th layer L, EL.

At the unit-layer formation step (step ST27) at which no nozzle extrusion control is performed, the print paths 50 are formed in such a manner that the boundaries 52 between the print paths 50 overlap each other in the deposition direction of the layers L.

In a similar manner to the embodiment, the ink-jet printer 1 and the method for forming the three-dimensional object in modification 3 ensure that streaks parallel to the main scanning direction are prevented from being generated on the produced three-dimensional object W. By the ink-jet printer 1 and the method for forming the three-dimensional object according to modification 3, when the nozzle extrusion control is performed, the print paths 50 are formed in such a manner that the boundaries 52 between the print paths 50 are deviated in the sub-scanning direction between the layers L, EL deposited on top of each other. Consequently, it is ensured that in depositing the layers L, EL, the boundaries 52 between the print paths 50 are prevented from being deposited on top of each other. This suppresses generation of streaks parallel to the main scanning direction on the produced three-dimensional object W.

Although the embodiments of the present invention have been described above, the present invention is not intended to be limited to these embodiments. In the present invention, the embodiments can be implemented in various other manners. Without departing from the subject matter of the invention, various omissions, replacements, and combination changes, for example, are possible. For example, in the above-described embodiment, the extruders 41Y, 41M, 41C, 41K, 41W, and 41CL, and the support ink extruder 44 are moved relative to the platform 2 to form the three-dimensional object W, for example. In the present invention, however, the three-dimensional object W, for example, may be formed without relative movement of the extruders 41Y, 41M, 41C, 41K, 41W, and 41CL, and the support ink extruder 44, and the platform 2. For example, in a case where the area of the deposited surface is equal to an extrusion region of the extruders 41Y, 41M, 41C. 41K, 41W, and 41CL, and the support ink extruder 44 (a case where the lengths in the main scanning direction are equal to each other or a case where the lengths in the sub-scanning direction are equal to each other is also possible), no relative movement is necessary.

DESCRIPTION OF THE REFERENCE NUMERAL

1 Ink-jet printer (three-dimensional printer)
2a Work surface (deposited surface)
41, 41Y, 41M, 41C, 41K, 41W, and 41CL Extruder
44 Support ink extruder (extruder)
5 Carriage driver (relative mover)
6 Platform driver (relative mover)
7 Controller
50 Print path
52 Boundary
302 Nozzle
303 Nozzle array
ST23 Slice information calculation step
ST25 Determination processing step
ST27 Unit-layer formation step
ST27A Printing step
ST27B Sub-scanning direction movement step
W Three-dimensional object
L Layer
R Region
E Support body (three-dimensional object)
EL Layer

The invention claimed is:
1. A method for forming a three-dimensional object, the method comprising:
    a slice information calculation step of dividing three-dimensional data that indicates a shape and a surface image of the three-dimensional object into a plurality of layers so as to calculate cross-sectional slice information of each of the layers; and
    a unit-layer formation step of forming each of the layers based on the cross-sectional slice information, the unit-layer formation step being repeated a plurality of times to deposit the layers so as to form the three-dimensional object by a three-dimensional printer,
    the unit-layer formation step comprising a printing step of extruding inks onto a deposited surface so as to form a single print path extending in a first direction,
    wherein at the printing step, a plurality of print paths are formed in a second direction that intersects the first direction so as to form each of the layers, and the print paths are formed in such a manner that a boundary between the print paths between each adjacent pair of the layers in a deposition direction of the layers is at least partly deviated in the second direction, and
    wherein at the unit-layer formation step, extruders configured to extrude the inks onto the deposited surface are configured to extrude the inks a plurality of times from a plurality of nozzles, which are arrayed in the second direction, at each position in each of the layers so as to form each of the layers, and the extruders are configured to be driven by nozzle extrusion control in which the print paths are set in such a manner that the boundaries between the print paths extend diagonally with respect to the first direction.

2. The method according to claim 1, further comprising a processing determination step of making a determination as to whether to perform the nozzle extrusion control for each part of the cross-sectional slice information,
    wherein at the unit-layer formation step, the extruders are configured to be driven by the nozzle extrusion control when the layers are formed based on part of the cross-sectional slice information as to which a determination has been made to perform the nozzle extrusion control at the processing determination step.

3. The method according to claim 2, wherein at the unit-layer formation step, when the layers are formed based on part of the cross-sectional slice information as to which a determination has been made not to perform the nozzle extrusion control at the processing determination step, the extruders are configured to be driven to form the print paths in such a manner that the boundaries between the print paths are parallel to the first direction.

4. The method according to claim 1,
    wherein a plurality of nozzle arrays each comprising the plurality of nozzles arrayed in the second direction are provided, and
    wherein the nozzle extrusion control is performed for each of the nozzle arrays as a unit.

5. The method according to claim 3,
    wherein the three-dimensional data comprises surface image data indicating surface colors of the three-dimensional object, and
    wherein at the processing determination step, a determination is made as to whether to perform the nozzle extrusion control based on the surface image data, which is the part of the cross-sectional slice information.

6. The method according to claim 2, wherein at the processing determination step, when a determination is made as to whether to perform the nozzle extrusion control for each part of the cross-sectional slice information, a shape indicated by part of the cross-sectional slice information as to which a determination is made as to whether to perform the nozzle extrusion control is compared with a shape indicated by part of the cross-sectional slice information of one layer formed right afterward, and a determination is made to perform the nozzle extrusion control as to a region of the part of the cross-sectional slice information as to which the determination is made as to whether to perform the nozzle extrusion control, which region overlaps the part of the cross-sectional slice information of the one layer formed right afterward.

7. The method according to claim 1,
wherein at the unit-layer formation step, when forming at least some of the print paths, the extruders are configured to extrude the inks from all of the plurality of nozzles arrayed in the second direction, and
wherein the print paths are formed in such a manner that the entire boundaries between the print paths between each pair of the layers adjacent to each other in the deposition direction of the layers are deviated in the second direction.

8. The method according to claim 3,
wherein a plurality of nozzle arrays each comprising the plurality of nozzles arrayed in the second direction are provided, and
wherein the nozzle extrusion control is performed for each of the nozzle arrays as a unit.

9. A method for forming a three-dimensional object, the method comprising:
a slice information calculation step of dividing three-dimensional data that indicates a shape and a surface image of the three-dimensional object into a plurality of layers so as to calculate cross-sectional slice information of each of the layers; and
a unit-layer formation step of forming each of the layers based on the cross-sectional slice information, the unit-layer formation step being repeated a plurality of times to deposit the layers so as to form the three-dimensional object by a three-dimensional printer,
the unit-layer formation step comprising a printing step of extruding inks onto a deposited surface so as to form a single print path extending in a first direction,
wherein at the printing step, a plurality of print paths are formed in a second direction that intersects the first direction so as to form each of the layers, and the print paths are formed in such a manner that a boundary between the print paths between each adjacent pair of the layers in a deposition direction of the layers is at least partly deviated in the second direction, and
wherein at the unit-layer formation step, extruders configured to extrude the inks onto the deposited surface are configured to extrude the inks a plurality of times from a plurality of nozzles, which are arrayed in the second direction, at each position in each of the layers so as to form each of the layers, and the extruders are configured to be driven by nozzle extrusion control in which extrusion duties from the nozzles of the extruders in the first direction are changed to make a width of the print paths in the second direction change in the first direction.

10. The method according to claim 9, further comprising a processing determination step of making a determination as to whether to perform the nozzle extrusion control for each part of the cross-sectional slice information,
wherein at the unit-layer formation step, the extruders are configured to be driven by the nozzle extrusion control when the layers are formed based on part of the cross-sectional slice information as to which a determination has been made to perform the nozzle extrusion control at the processing determination step.

11. The method according to claim 10, wherein at the unit-layer formation step, when the layers are formed based on part of the cross-sectional slice information as to which a determination has been made not to perform the nozzle extrusion control at the processing determination step, the extruders are configured to be driven to form the print paths in such a manner that the boundaries between the print paths are parallel to the first direction.

12. The method according to claim 9,
wherein a plurality of nozzle arrays each comprising the plurality of nozzles arrayed in the second direction are provided, and
wherein the nozzle extrusion control is performed for each of the nozzle arrays as a unit.

13. The method according to claim 11,
wherein a plurality of nozzle arrays each comprising the plurality of nozzles arrayed in the second direction are provided, and
wherein the nozzle extrusion control is performed for each of the nozzle arrays as a unit.

14. A three-dimensional printer to form a three-dimensional object based on three-dimensional data indicating a shape and a surface image of the three-dimensional object, the three-dimensional printer comprising:
extruders configured to extrude inks for forming the three-dimensional object onto a deposited surface; and
a controller configured to control the extruders and relative movers,
wherein the controller is configured to perform a slice information calculation step of dividing the three-dimensional data into a plurality of layers and calculating cross-sectional slice information of each of the layers, and a unit-layer formation step of forming each of the layers based on the cross-sectional slice information, and the controller is configured to repeat the unit-layer formation step a plurality of times and deposit the layers so as to form the three-dimensional object, and
wherein at the unit-layer formation step, a printing step is performed to form a single print path extending in a first direction by the extruders, and to form a plurality of the print paths in a second direction intersecting the first direction so as to form each of the layers, and the print paths are formed in such a manner that between each adjacent pair of the layers in a deposition direction of the layers, a boundary between the print paths is at least partly deviated in the second direction, and
wherein at the unit-layer formation step, the extruders configured to extrude the inks onto the deposited surface are configured to extrude the inks a plurality of times from a plurality of nozzles, which are arrayed in the second direction, at each position in each of the layers so as to form each of the layers, and the extruders are configured to be driven by nozzle extrusion control in which the print paths are set in such a manner that the boundaries between the print paths extend diagonally with respect to the first direction.

* * * * *